(12) United States Patent
Mahabaleshwara et al.

(10) Patent No.: US 12,557,920 B2
(45) Date of Patent: Feb. 24, 2026

(54) MULTI LOCATION FOLDABLE BASSINET

(71) Applicant: B/E Aerospace, Inc., Winston-Salem, NC (US)

(72) Inventors: Aravinda Mahabaleshwara, Hyderabad (IN); Ashwin Srinivasa, Hyderabad (IN); Tippanna Channabasappa Shetgar, Benagaluru (IN)

(73) Assignee: B/E Aerospace, Inc., Winston-Salem, NC (US)

( * ) Notice: Subject to any disclaimer, the term of this patent is extended or adjusted under 35 U.S.C. 154(b) by 140 days.

(21) Appl. No.: 18/536,759

(22) Filed: Dec. 12, 2023

(65) Prior Publication Data

US 2025/0120520 A1 Apr. 17, 2025

(30) Foreign Application Priority Data

Oct. 16, 2023 (IN) ............................. 202311070093

(51) Int. Cl.
*A47D 9/00* (2006.01)
*B64D 11/06* (2006.01)

(52) U.S. Cl.
CPC .......... *A47D 9/005* (2013.01); *B64D 11/0612* (2014.12); *B64D 11/0639* (2014.12)

(58) Field of Classification Search
CPC ...... A47D 9/00; A47D 9/005; B64D 11/0612; B64D 11/0639
See application file for complete search history.

(56) References Cited

U.S. PATENT DOCUMENTS

| | | | | |
|---|---|---|---|---|
| 2,584,481 | A | * | 2/1952 | Mast .................... B60N 2/3084 297/238 |
| 2,676,336 | A | * | 4/1954 | Gilmer ................. B60N 2/2854 5/94 |
| 3,272,554 | A | * | 9/1966 | Simer .................... B60N 2/283 297/256 |
| 4,480,870 | A | * | 11/1984 | von Wimmersperg ..................... B60N 2/2809 297/256.13 |
| 4,540,216 | A | * | 9/1985 | Hassel, Sr. ........... B60N 2/3084 297/238 |
| 4,555,135 | A | * | 11/1985 | Freeland .............. B60N 2/3086 297/238 |
| 4,596,420 | A | * | 6/1986 | Vaidya ................. B60N 2/3084 297/238 |

(Continued)

FOREIGN PATENT DOCUMENTS

| | | | |
|---|---|---|---|
| EP | 2944227 A1 | 11/2015 |
| EP | 3990349 A1 | 5/2022 |

(Continued)

OTHER PUBLICATIONS

European Search Report received in EP Application No. 24202995, Nov. 14, 2024, 7 pages.

*Primary Examiner* — David E Sosnowski
(74) *Attorney, Agent, or Firm* — Suiter Swantz IP

(57) ABSTRACT

A bassinet is foldable between a stowed position and a deployed position. The bassinet includes a casing which is wall-mountable. The bassinet includes flanges and panels which are coupled to the casing. The panels are flush with the flanges in the stowed position. The panels define the sides and base of the bassinet in the deployed position.

18 Claims, 18 Drawing Sheets

(56) References Cited

U.S. PATENT DOCUMENTS

| | | | | | |
|---|---|---|---|---|---|
| 4,632,456 | A | * | 12/1986 | Kassai | B60N 2/2839 297/328 |
| 4,709,960 | A | * | 12/1987 | Launes | B60N 2/2821 297/256.13 |
| 4,756,573 | A | * | 7/1988 | Simin | B60N 2/3084 297/238 |
| 4,900,087 | A | * | 2/1990 | Crisp | B60N 2/3084 297/238 |
| 4,936,627 | A | * | 6/1990 | Guim | B60N 2/3084 297/238 |
| 4,943,112 | A | * | 7/1990 | Law | B60N 2/3084 297/238 |
| 4,986,600 | A | * | 1/1991 | Leblanc | B60N 2/3084 297/238 |
| 5,100,199 | A | * | 3/1992 | Vander Stel | A61K 31/4453 297/238 |
| 5,106,158 | A | * | 4/1992 | Dukatz | B60N 2/3084 297/238 |
| 5,161,855 | A | * | 11/1992 | Harmon | B60N 2/3084 297/238 |
| 5,232,263 | A | * | 8/1993 | D'Uii | B64D 11/06 297/184.12 |
| 5,385,384 | A | * | 1/1995 | Gierman | B60R 22/105 297/216.12 |
| 5,466,043 | A | * | 11/1995 | Lambert | B60N 2/3084 297/14 |
| 5,496,092 | A | * | 3/1996 | Williams | B60N 2/2812 297/256.13 |
| 5,524,962 | A | * | 6/1996 | Fulgenzi | B60N 2/3081 297/238 |
| 5,524,965 | A | * | 6/1996 | Barley | B60N 2/2863 297/256.16 |
| 5,775,771 | A | * | 7/1998 | La Cour | B60N 2/3084 297/238 |
| 5,810,436 | A | * | 9/1998 | Surot | B60N 2/2821 297/256.13 |
| 5,845,876 | A | * | 12/1998 | Zach, Sr. | B64D 11/0612 244/118.6 |
| 5,899,534 | A | * | 5/1999 | Gray | B60N 2/3084 297/238 |
| 6,089,662 | A | * | 7/2000 | Lambert | B60N 2/3084 297/238 |
| 6,220,665 | B1 | * | 4/2001 | Dingel | B60N 2/3084 297/238 |
| 6,474,732 | B1 | * | 11/2002 | Merensky | B64D 11/0612 297/14 |
| 6,767,058 | B2 | * | 7/2004 | McClellan-Derrickson | B60N 2/2806 297/255 |
| 7,070,239 | B1 | * | 7/2006 | Ugrekhelidze | B60N 2/3084 297/238 |
| 7,188,899 | B1 | * | 3/2007 | McClellan-Derrickson | B60N 2/2806 297/188.06 |
| 7,517,016 | B1 | * | 4/2009 | West | B60N 2/3086 297/240 |
| 7,997,647 | B2 | * | 8/2011 | Sjoquist | B60N 2/14 297/238 |
| 9,227,535 | B2 | * | 1/2016 | Coman | B64D 11/062 |
| 10,766,386 | B1 | * | 9/2020 | West | B60N 2/265 |
| 11,021,084 | B2 | * | 6/2021 | Sakurai | B60N 2/3047 |
| 11,492,122 | B2 | * | 11/2022 | Moe | B64D 11/0627 |
| 11,779,130 | B2 | * | 10/2023 | Zhong | A47D 9/005 5/99.1 |
| 11,993,185 | B2 | * | 5/2024 | Gardner | B60N 2/2812 |
| 2004/0232747 | A1 | * | 11/2004 | Yamazaki | B60N 2/2884 297/250.1 |
| 2006/0055228 | A1 | * | 3/2006 | Tsai | B60N 2/2839 297/488 |
| 2007/0170758 | A1 | * | 7/2007 | Allen | B60N 2/2872 297/250.1 |
| 2007/0277321 | A1 | * | 12/2007 | Leach | A47D 5/006 5/655 |
| 2009/0206640 | A1 | * | 8/2009 | Chen | B60N 2/3086 297/216.11 |
| 2011/0065344 | A1 | * | 3/2011 | Breuer | B64D 25/02 297/464 |
| 2011/0119832 | A1 | * | 5/2011 | Hung | A47D 15/003 5/655 |
| 2011/0233978 | A1 | * | 9/2011 | Clement | B60N 2/2884 297/256.13 |
| 2012/0063702 | A1 | * | 3/2012 | Daugherty | A47D 9/005 383/4 |
| 2013/0187421 | A1 | * | 7/2013 | Foye | B60R 22/105 297/232 |
| 2015/0345778 | A1 | * | 12/2015 | Rubel | F21V 33/0012 362/184 |
| 2017/0101035 | A1 | * | 4/2017 | Sam | B60N 2/2866 |
| 2018/0027990 | A1 | * | 2/2018 | Kroeker | A47D 13/02 |
| 2018/0134186 | A1 | * | 5/2018 | Mizuno | B60N 2/22 |
| 2019/0152355 | A1 | * | 5/2019 | Mizuno | B60N 2/32 |
| 2019/0184861 | A1 | * | 6/2019 | Virdis | B60N 2/265 |
| 2019/0389337 | A1 | * | 12/2019 | Johnson | B60N 2/3084 |
| 2020/0130848 | A1 | * | 4/2020 | Bakhsh | B64D 11/0698 |
| 2020/0139858 | A1 | * | 5/2020 | Gardner | B60N 2/2812 |
| 2021/0214087 | A1 | * | 7/2021 | Moe | B64D 11/0606 |
| 2022/0332421 | A1 | * | 10/2022 | Dowty | B64D 11/0627 |
| 2024/0299222 | A1 | * | 9/2024 | Dowty | B64D 11/0612 |

FOREIGN PATENT DOCUMENTS

| | | | | | |
|---|---|---|---|---|---|
| EP | | 4074599 | A1 | * | 10/2022 | B64D 11/0606 |
| EP | | 4541716 | A1 | * | 4/2025 | A47D 9/005 |

* cited by examiner

100

100

100

100

100

100

100

200

MULTI LOCATION FOLDABLE BASSINET

CROSS REFERENCE TO RELATED APPLICATION(S)

The present application claims the benefit of India Provisional Patent Application 202311070093, filed Oct. 16, 2023, titled "MULTI LOCATION FOLDABLE BASSINET", with a DAS code of FD78, which is incorporated herein by reference in the entirety.

TECHNICAL FIELD

The present invention generally relates to seats for aircrafts, and more specifically to seats adapted for infants.

BACKGROUND

Aircraft may include the capability to carry infants. Carrying an infant inside an aircraft can be challenging. One method to carry infants is to purchase an additional seat and strap an infant carrier (e.g., car seat) to the additional seat. Some aircraft include bassinet affixed within the cabin. The airlines do not guarantee that such bassinets are available. The bassinets are usually allotted to passengers on a first come first serve basis. Existing bassinets are kept in cabinetry. Installing the bassinet requires removing the bassinet with assistance from a flight attendant. Additionally, the bassinets occupy significant space in the cabinetry. Therefore, it would be advantageous to provide a device, system, and method that cures the shortcomings described above.

SUMMARY

A bassinet is described. The bassinet comprises a casing. The casing defines a first set of one or more guide slots and a second set of one or more guide slots. The bassinet comprises a first flange. The bassinet comprises a second flange. The bassinet comprises a longitudinal panel. The bassinet comprises a first side panel. The first side panel is hinged to the first flange and the longitudinal panel. The bassinet comprises a second side panel. The second side panel is hinged to the second flange and the longitudinal panel. The bassinet comprises a base panel. The base panel is hinged to the longitudinal panel and the casing. The bassinet is configured to fold between a stowed position and a deployed position. The first flange follows the first set of one or more guide slots and the second flange follows the second set of one or more guide slots as the bassinet folds between the stowed position and the deployed position.

In some embodiments, the casing comprises a frame portion and a bezel portion. The frame portion defines the first set of one or more guide slots and the second set of one or more guide slots; wherein the bezel portion surrounds the frame portion.

In some embodiments, the first flange, the second flange, the longitudinal panel, the first side panel, the second side panel, and the base panel are flush mount to the bezel portion when the bassinet is in the stowed position.

In some embodiments, the casing comprises one or more attachment portions. The attachment portions extend from the bezel portion.

In some embodiments, the bassinet comprises a first set of one or more pins and a second set of one or more pins. The first set of one or more pins couple the first flange to the first set of one or more guide slots. The second set of one or more pins couple the second flange to the second set of one or more guide slots.

In some embodiments, the casing defines a first set of one or more locking slots. The first set of one or more locking slots extend from the first set of one or more guide slots. The first flange defines a first set of one or more flange slots. The first set of one or more flange slots are aligned with the first set of one or more locking slots when the bassinet is in the deployed position. The first set of one or more pins are configured to follow the first set of one or more flange slots and the first set of one or more locking slots when the bassinet is in the deployed position.

In some embodiments, the first set of one or more pins are configured to follow the first set of one or more flange slots and the first set of one or more locking slots between an unlocked position and a locked position. The first set of one or more pins are prevented from following the first set of one or more guide slots when in the locked position.

In some embodiments, the first set of one or more locking slots are set at one of a horizontal angle or a vertical angle.

In some embodiments, the bassinet comprises a first set of one or more locking mechanisms. The first set of one or more locking mechanisms are configured to lock to prevent the first flange from translating relative to the casing. The first set of one or more locking mechanisms are coupled to the first set of one or more pins.

In some embodiments, the first set of one or more locking mechanisms comprises a cam lever.

In some embodiments, the second set of one or more guide slots are mirrored to the first set of one or more guide slots.

In some embodiments, the first set of one or more guide slots and the second set of one or more guide slots are set at a 45-degree angle. The first set of one or more guide slots are orthogonal to the second set of one or more guide slots.

In some embodiments, the first side panel is hinged to the first flange and the longitudinal panel at opposing ends of the first side panel. The second side panel is hinged to the second flange and the longitudinal panel at opposing ends of the second side panel. The longitudinal panel is hinged to the first side panel and to the second side panel at opposing ends of the longitudinal panel. The longitudinal panel is hinged to the base panel between the opposing ends of the longitudinal panel. The base panel is hinged to the longitudinal panel and the casing at opposing ends of the base panel.

In some embodiments, the bassinet comprises a restraint system. The restraint system is coupled to at least one of the casing, the first flange, the second flange, the longitudinal panel, the first side panel, the second side panel, or the base panel. The restraint system comprises a harness.

In some embodiments, the bassinet comprises beading. The beading is coupled across top edges of the longitudinal panel, the first side panel, and the second side panel.

In some embodiments, the first set of one or more guide slots and the second set of one or more guide slots are rectilinear.

In some embodiments, the first side panel is orthogonal to the first flange and the second side panel is orthogonal to the second side panel when the bassinet is in the deployed position.

In some embodiments, the base panel is orthogonal to the first side panel and the second side panel when the bassinet is in the deployed position.

In some embodiments, the longitudinal panel is orthogonal first side panel, the second side panel, and the base panel when the bassinet is in the deployed position.

An aircraft cabin is described. The aircraft cabin comprises a bulkhead. The aircraft cabin comprises a bassinet. The bassinet comprises a casing. The casing is coupled to the bulkhead. The casing defines a first set of one or more guide slots and a second set of one or more guide slots. The bassinet comprises a first flange. The bassinet comprises a second flange. The bassinet comprises a longitudinal panel. The bassinet comprises a first side panel; wherein the first side panel is hinged to the first flange and the longitudinal panel. The bassinet comprises a second side panel. The second side panel is hinged to the second flange and the longitudinal panel. The bassinet comprises a base panel. The base panel is hinged to the longitudinal panel and the casing. The bassinet is configured to fold between a stowed position and a deployed position. The first flange follows the first set of one or more guide slots and the second flange follows the second set of one or more guide slots as the bassinet folds between the stowed position and the deployed position.

BRIEF DESCRIPTION OF THE DRAWINGS

Implementations of the concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIG. 1O depicts a partial exploded view of a bassinet in a deployed position, in accordance with one or more embodiments of the present disclosure.

DETAILED DESCRIPTION OF THE INVENTION

Figure 1A:
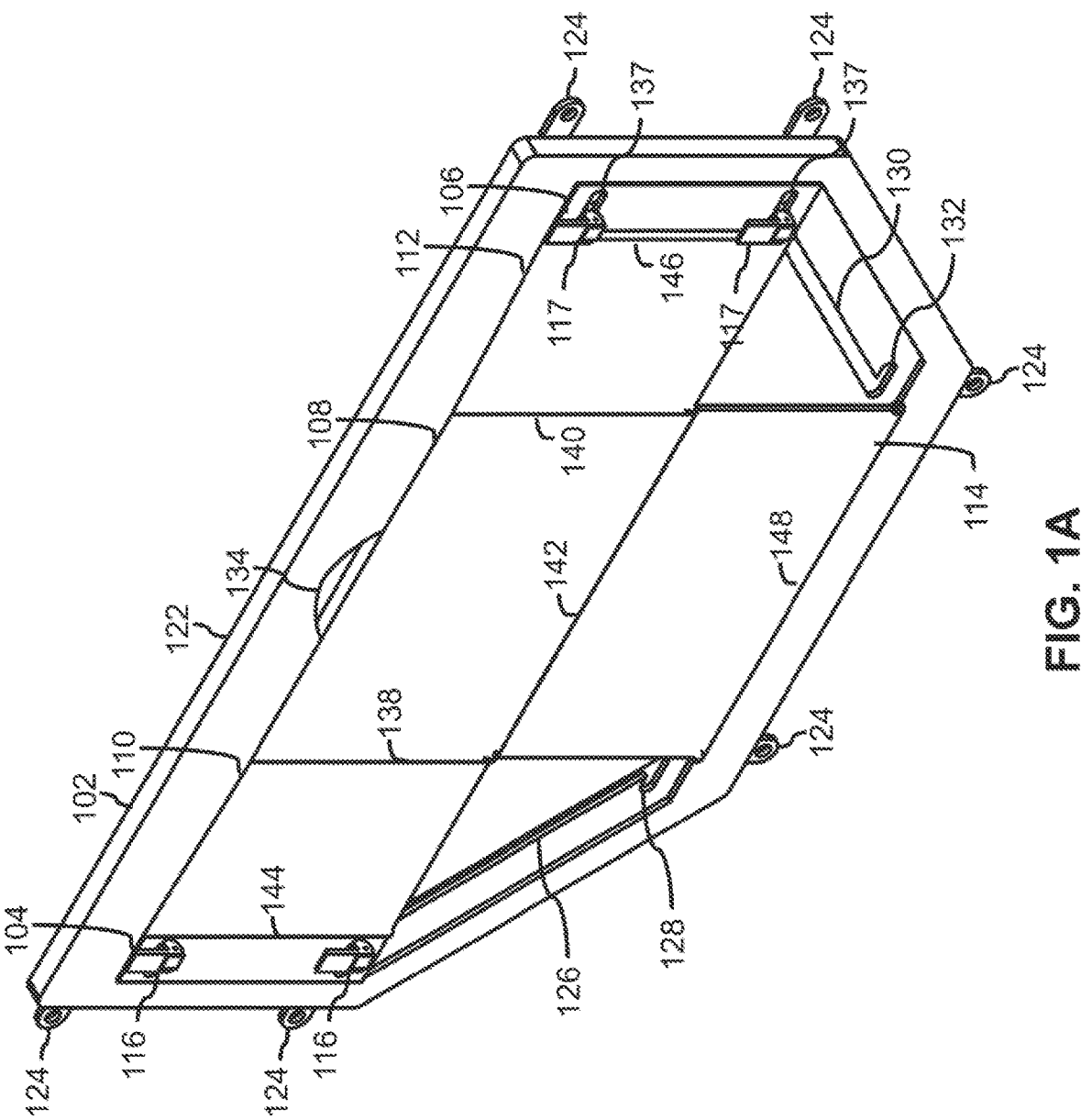
FIG. 1A depicts a perspective view of a bassinet in a stowed position with locked levers, in accordance with one or more embodiments of the present disclosure.
Figure 1B:
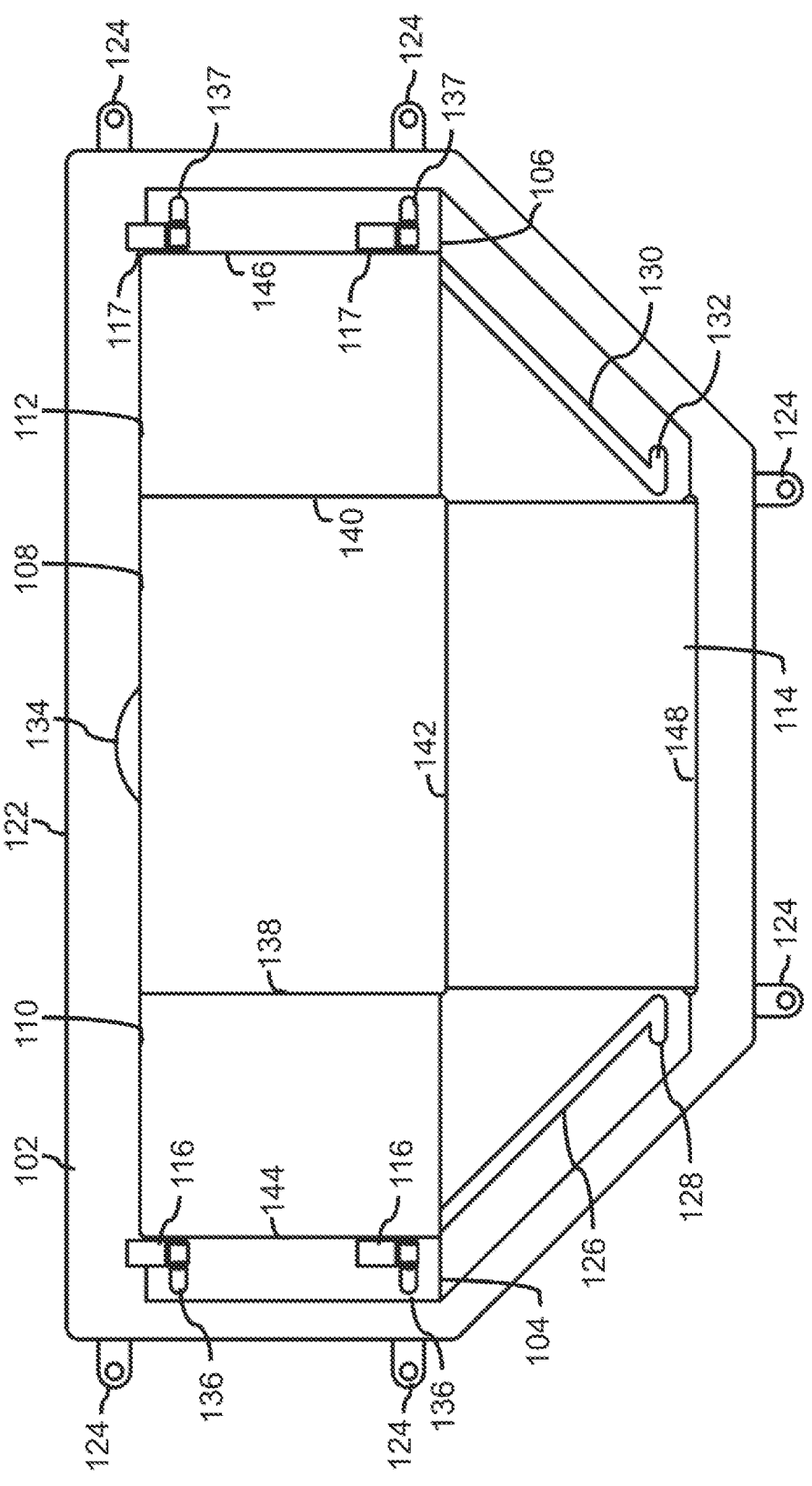
FIG. 1B depicts a front view of a bassinet in a stowed position with locked levers, in accordance with one or more embodiments of the present disclosure.
Figure 1C:
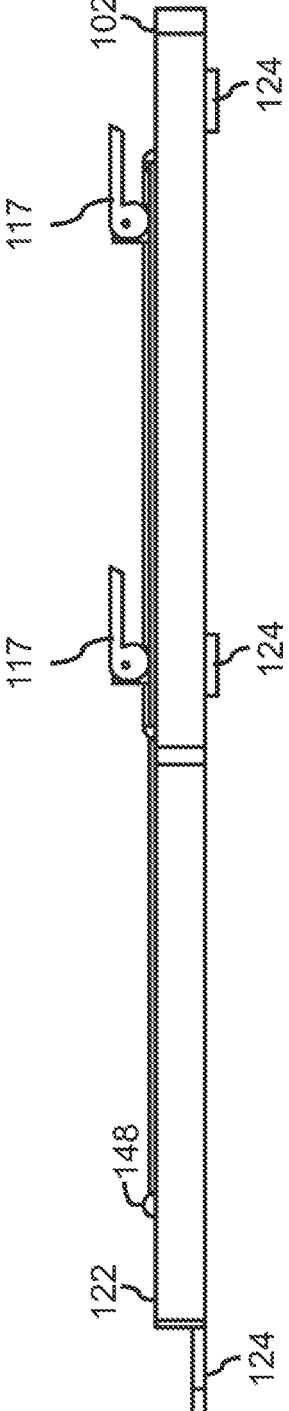
FIG. 1C depicts a side view of a bassinet in a stowed position with locked levers, in accordance with one or more embodiments of the present disclosure.
Figure 1D:
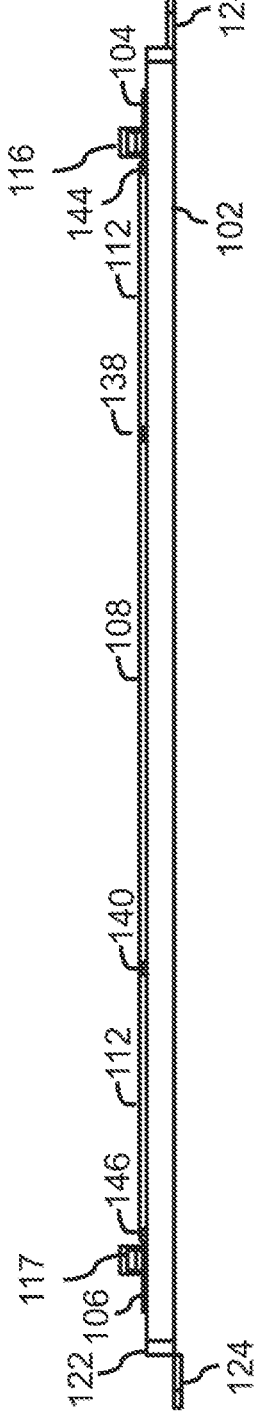
FIG. 1D depicts a top view of a bassinet in a stowed position with locked levers, in accordance with one or more embodiments of the present disclosure.
Figure 1E:
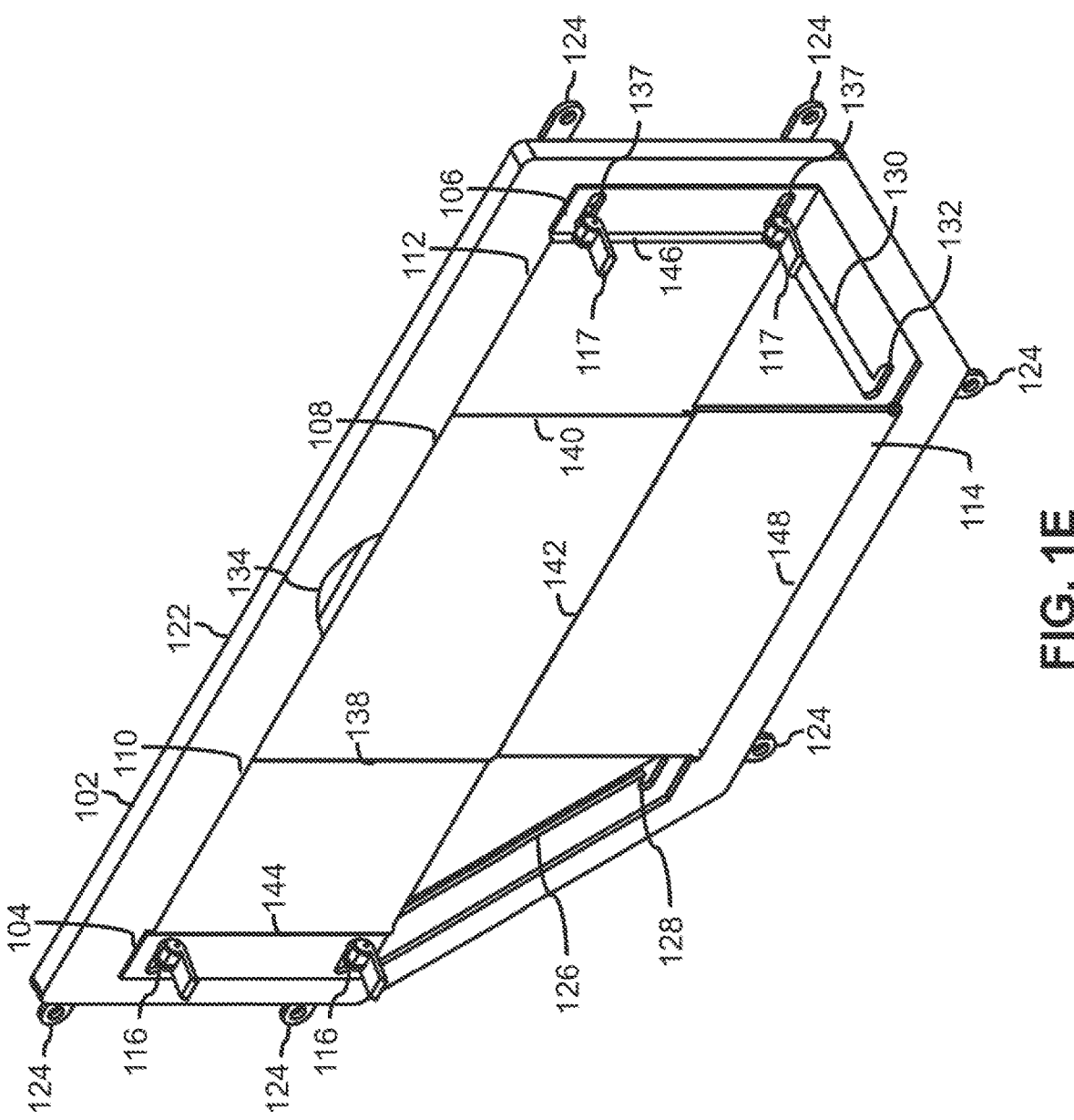
FIG. 1E depicts a perspective view of a bassinet in a stowed position with unlocked levers, in accordance with one or more embodiments of the present disclosure.
Figure 1F:
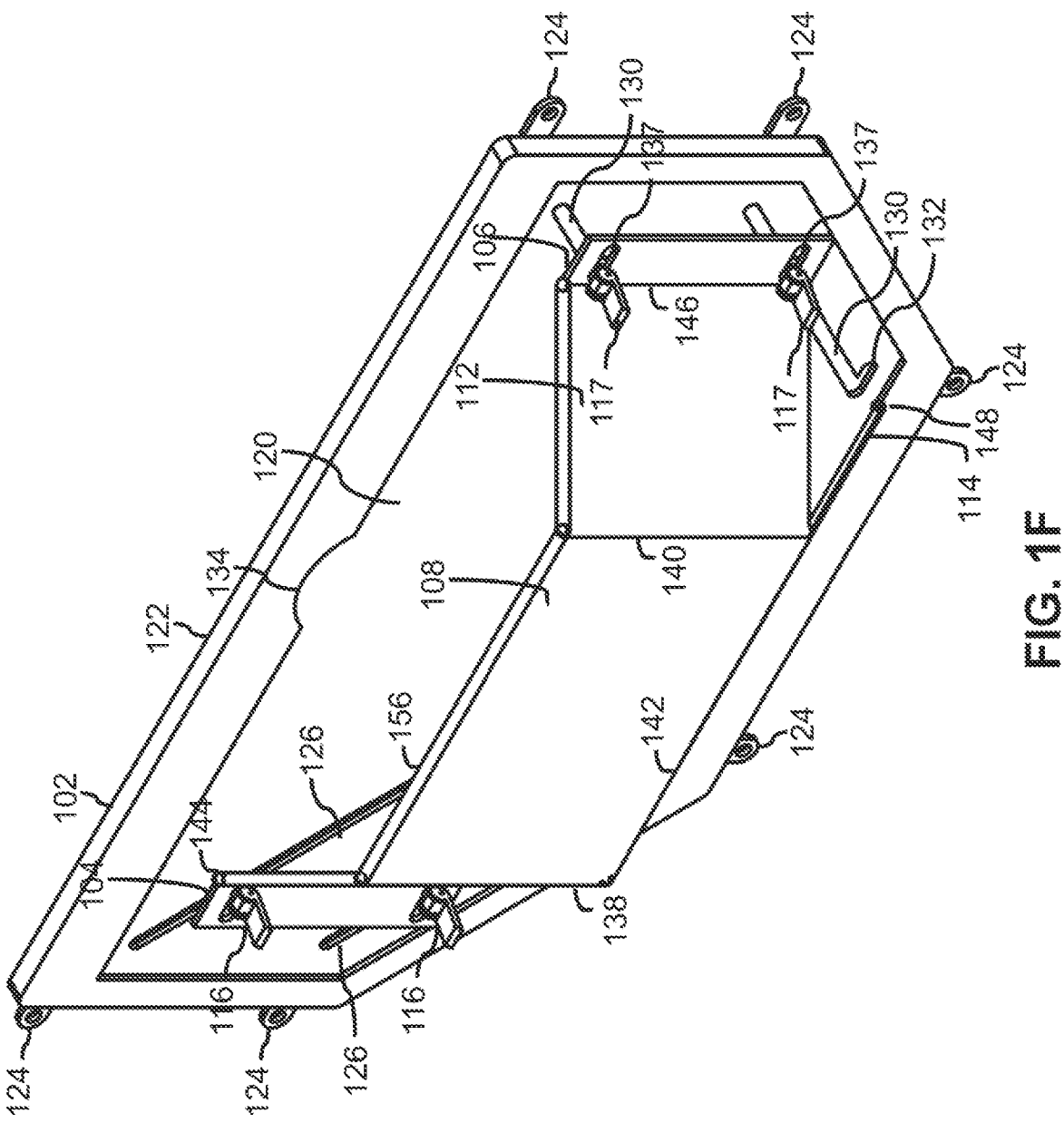
FIG. 1F depicts a perspective view of a bassinet midway between a stowed position and a deployed position, in accordance with one or more embodiments of the present disclosure.
Figure 1G:
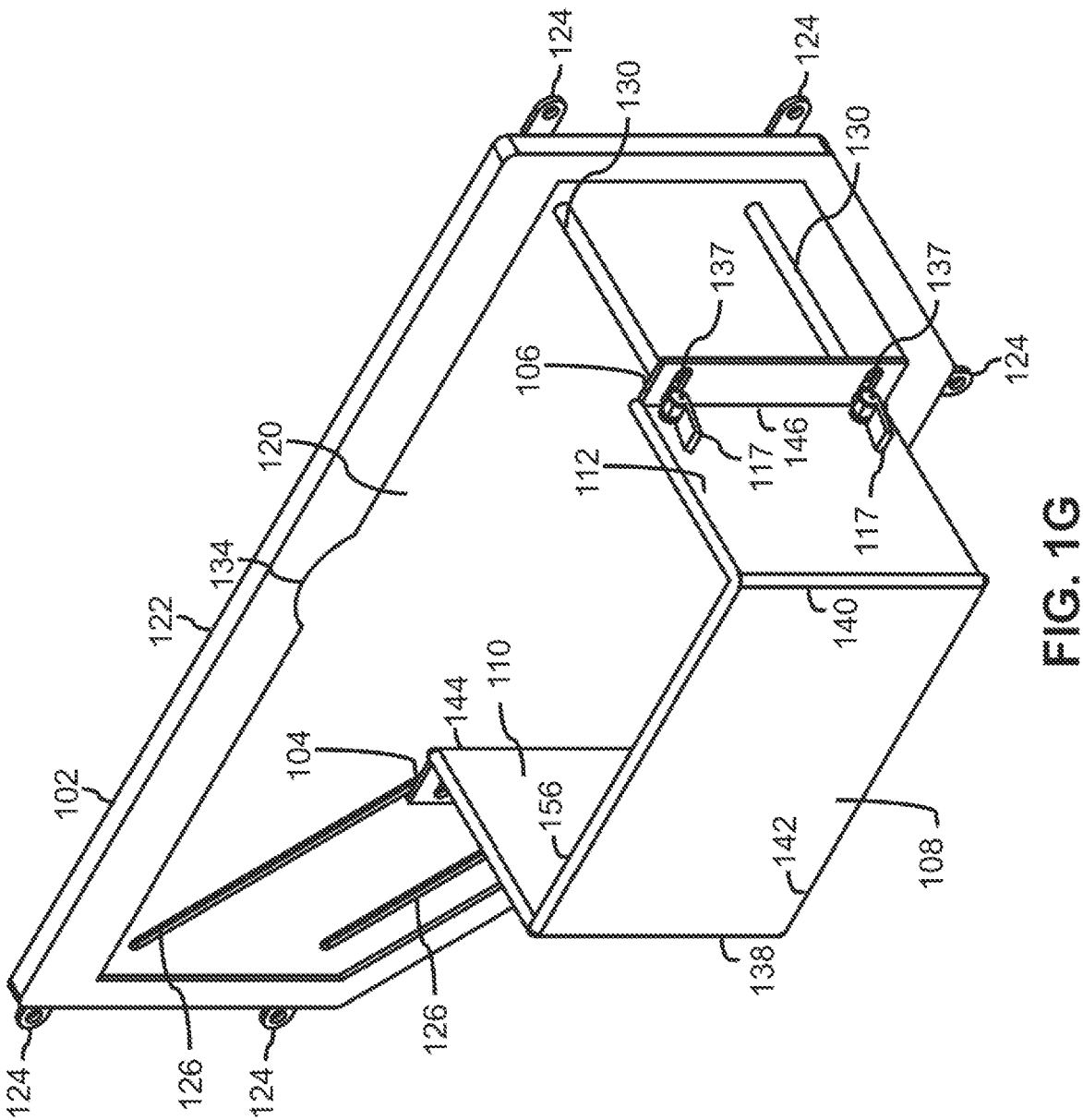
FIG. 1G depicts a perspective view of a bassinet in a deployed position with unlocked levers and pins in an unlocked position, in accordance with one or more embodiments of the present disclosure.
Figure 1H:
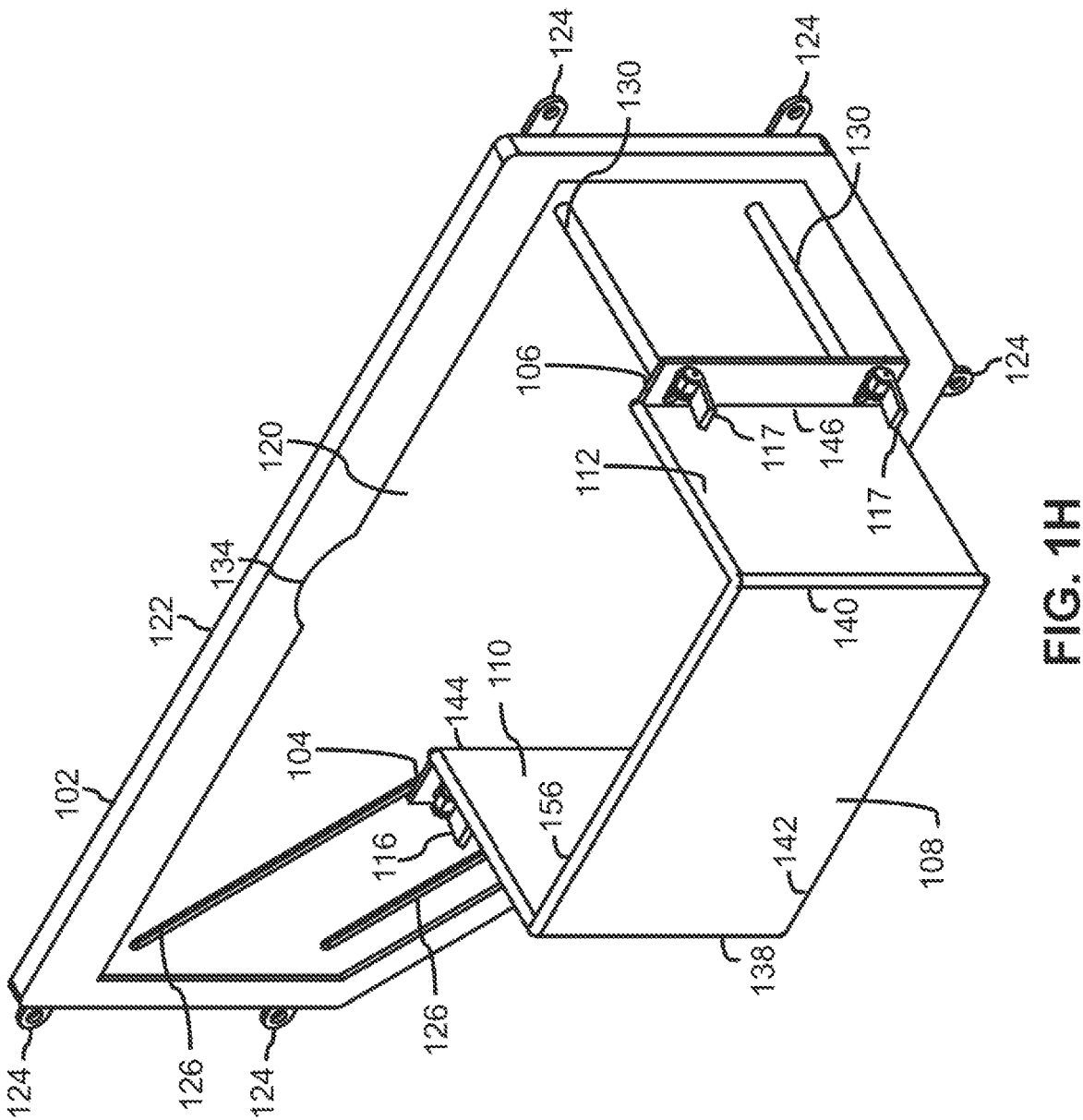
FIG. 1H depicts a perspective view of a bassinet in a deployed position with unlocked levers and pins in a locked position, in accordance with one or more embodiments of the present disclosure.
Figure 1I:
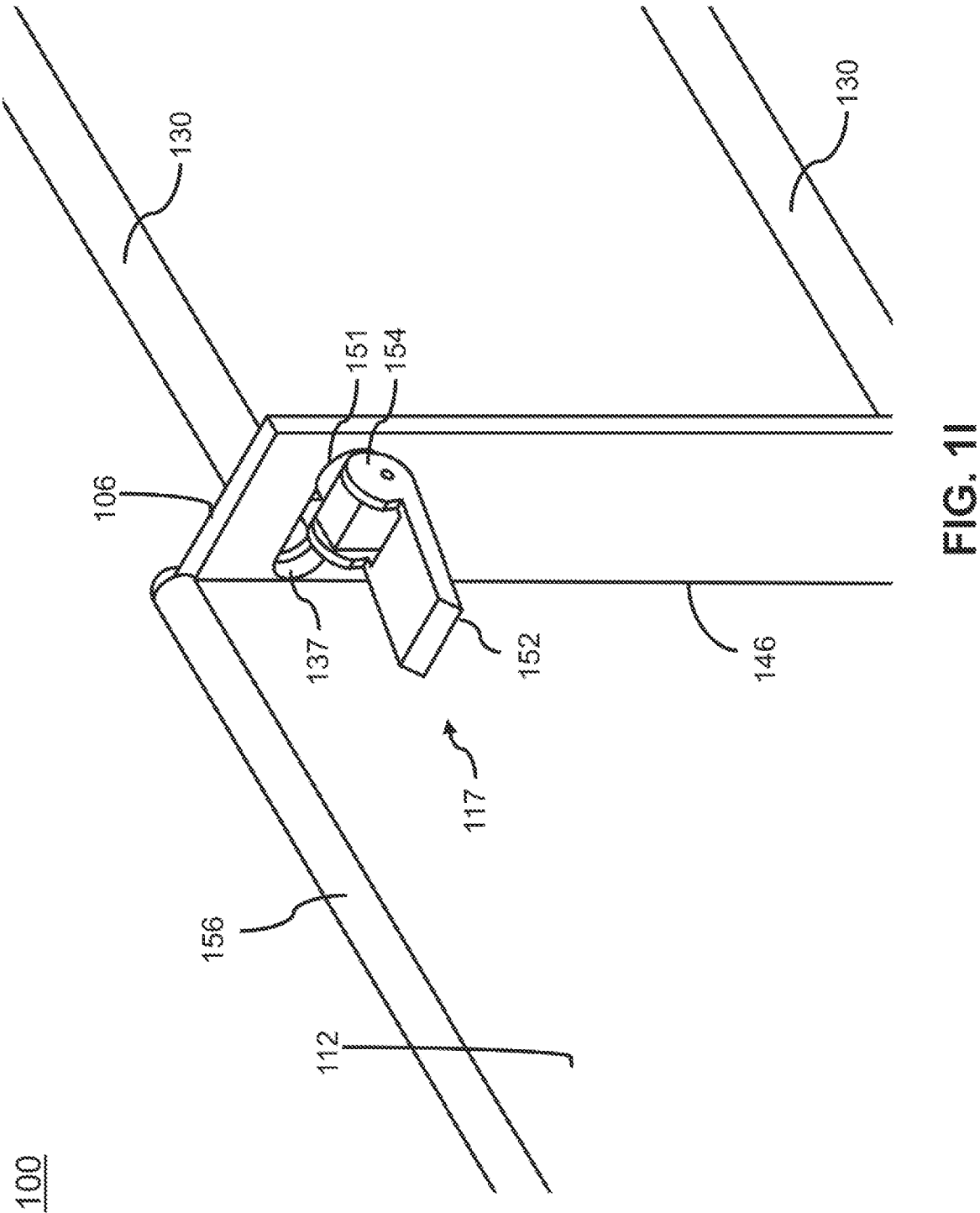
FIG. 1I depicts a partial perspective view of a bassinet in a deployed position with unlocked levers and pins in a locked position, in accordance with one or more embodiments of the present disclosure.
Figure 1J:
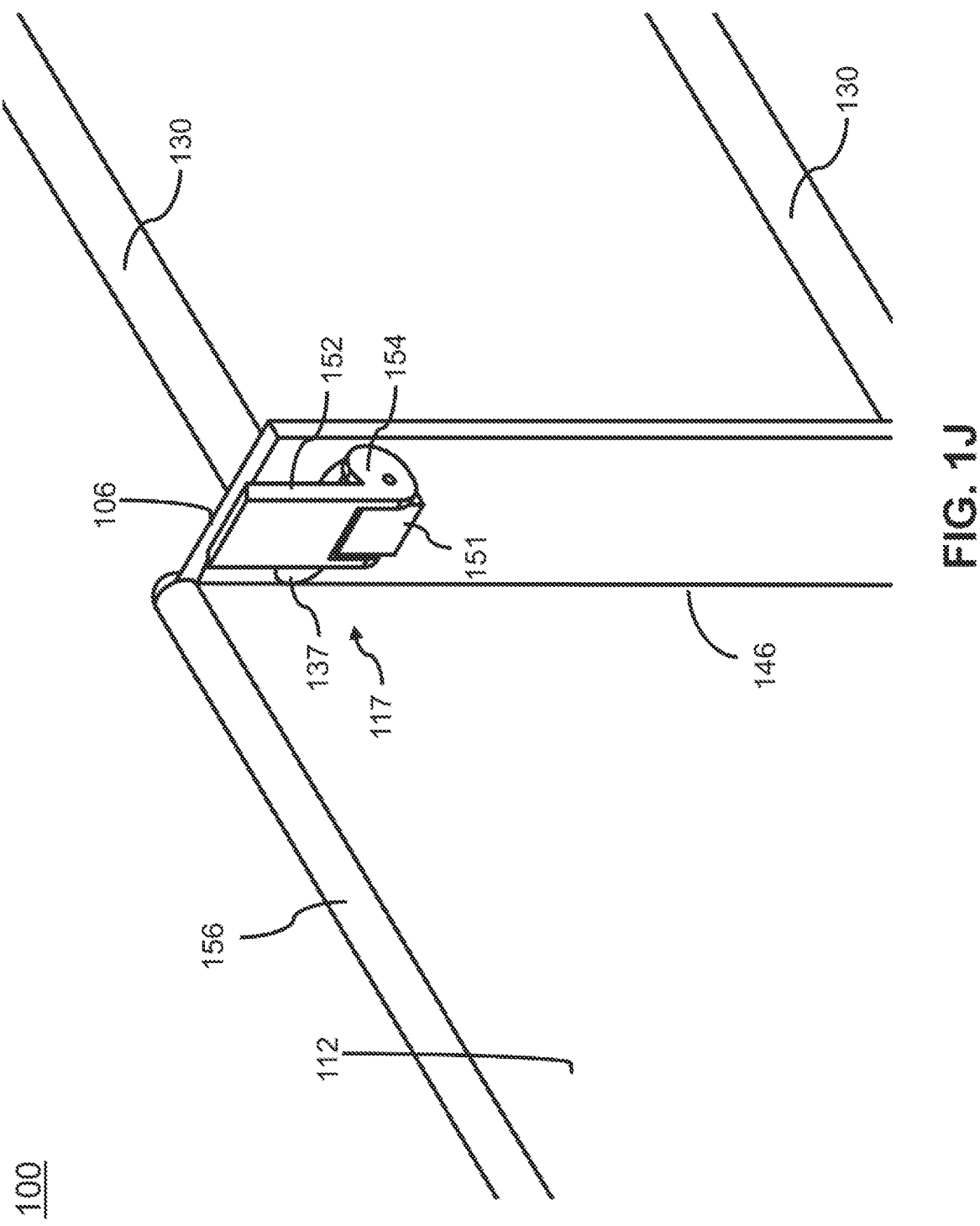
FIG. 1J depicts a partial perspective view of a bassinet in a deployed position with locked levers and pins in a locked position, in accordance with one or more embodiments of the present disclosure.
Figure 1K:
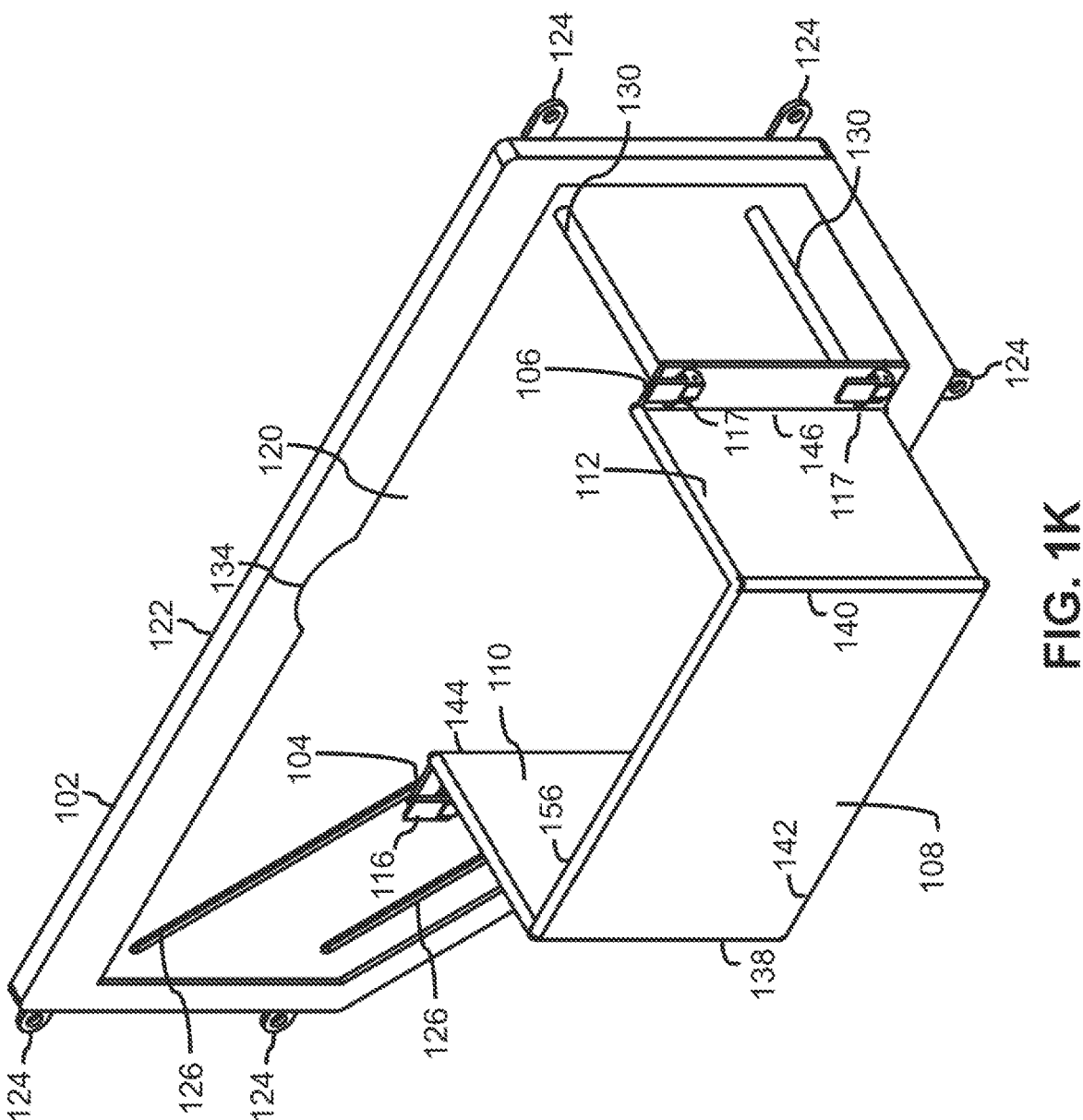
FIG. 1K depicts a perspective view of a bassinet in a deployed position with locked levers and pins in a locked position, in accordance with one or more embodiments of the present disclosure.
Figure 1L:
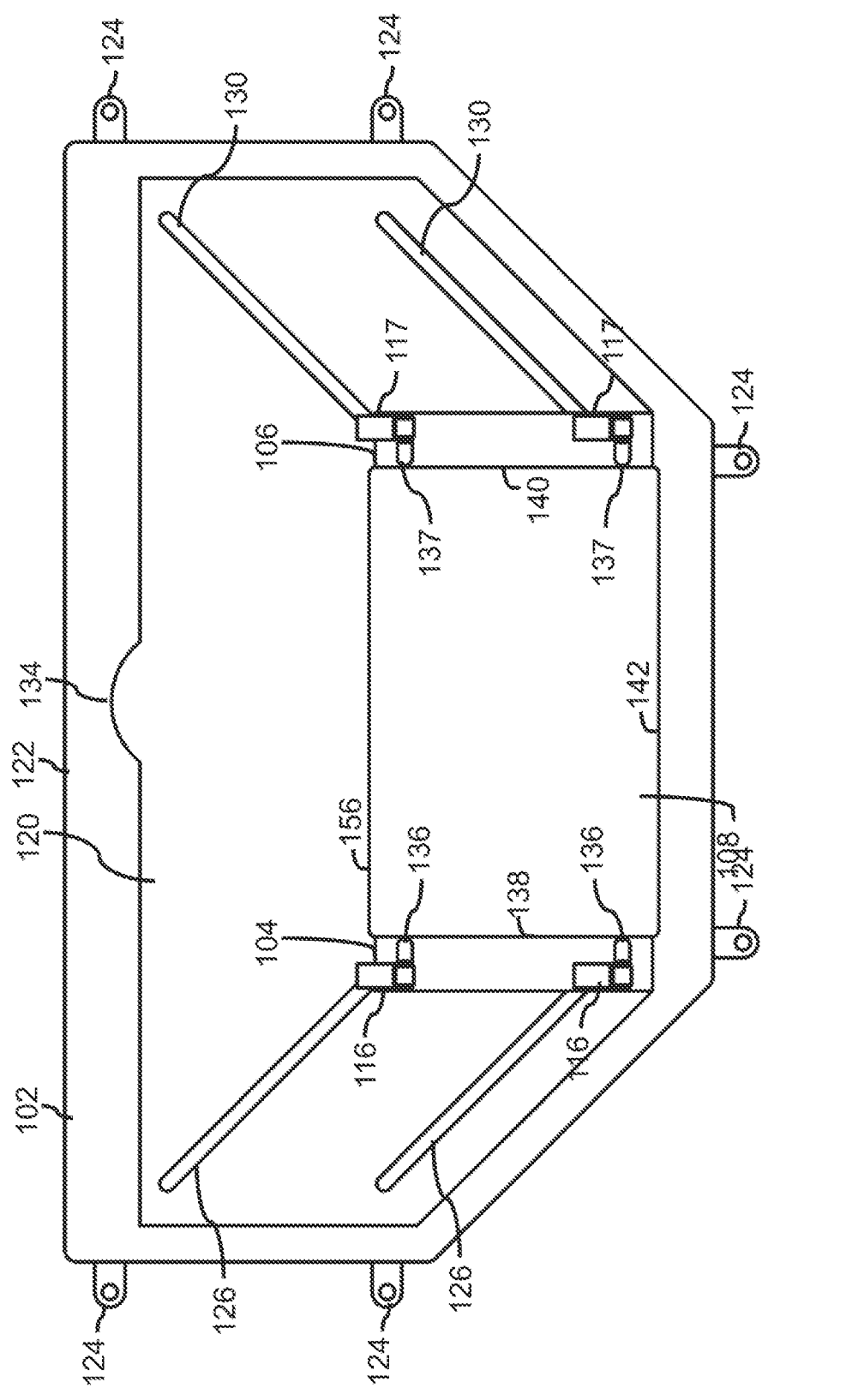
FIG. 1L depicts a front view of a bassinet in a deployed position with locked levers and pins in a locked position, in accordance with one or more embodiments of the present disclosure.
Figure 1M:
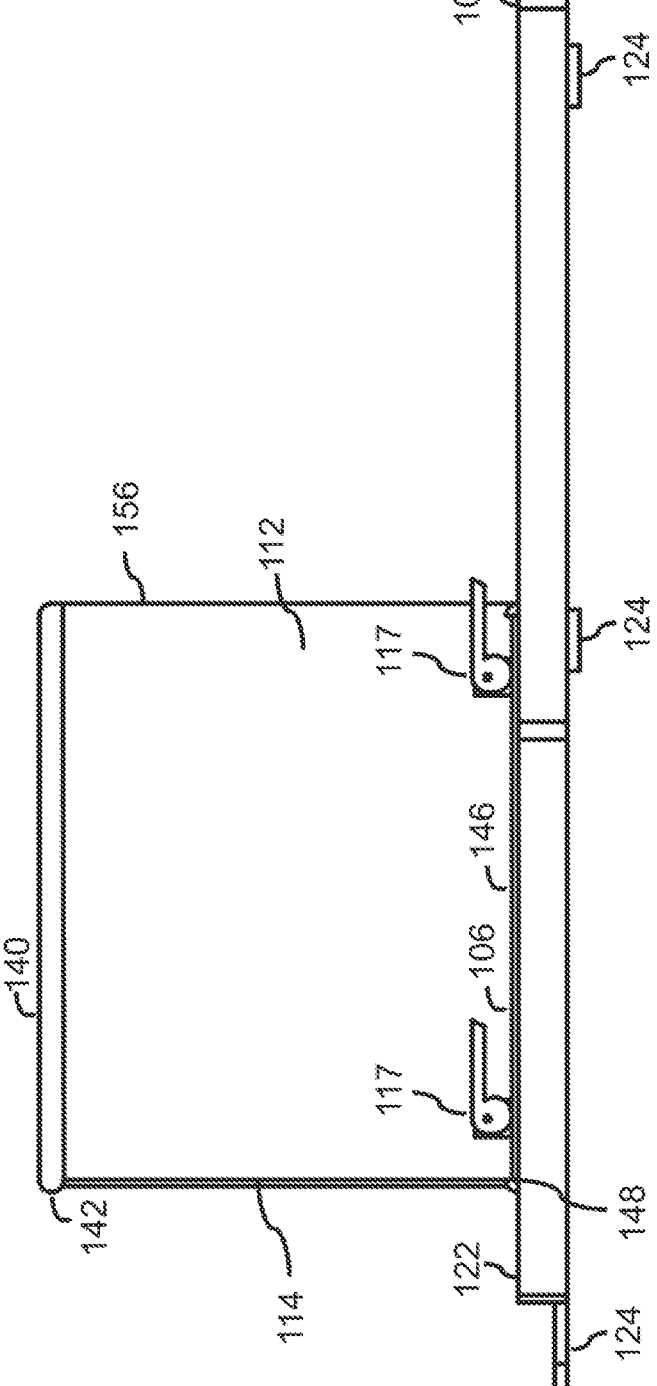
FIG. 1M depicts a side view of a bassinet in a deployed position with locked levers and pins in a locked position, in accordance with one or more embodiments of the present disclosure.
Figure 1N:
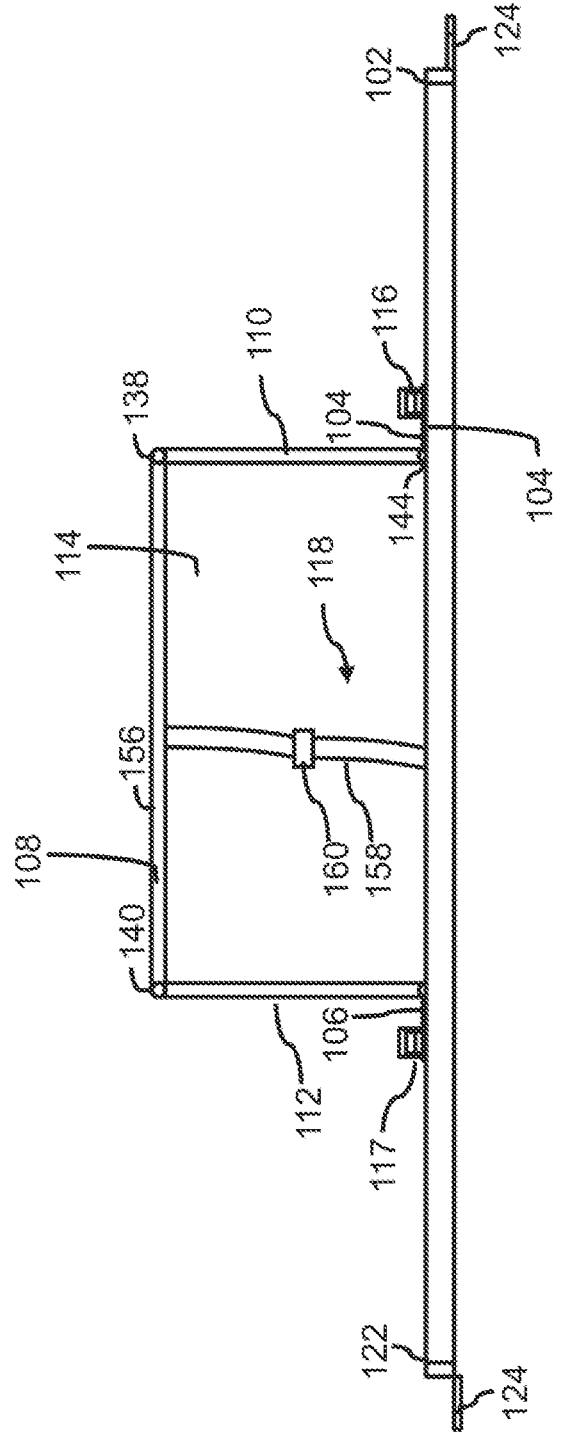
FIG. 1N depicts a top view of a bassinet in a deployed position with locked levers and a restraint system, in accordance with one or more embodiments of the present disclosure.
Figure 10:
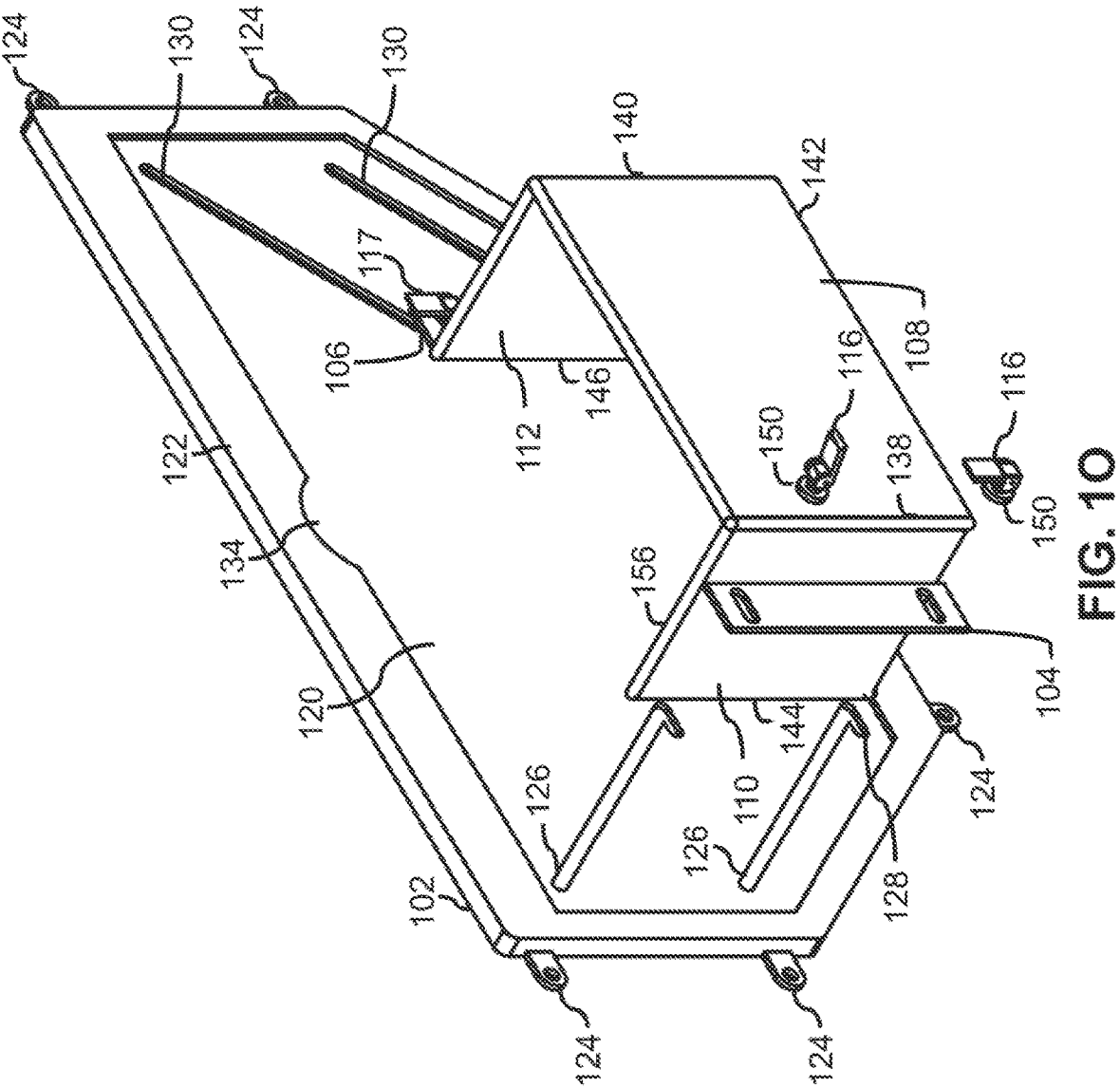

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details are set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a"

and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Reference will now be made in detail to the subject matter disclosed, which is illustrated in the accompanying drawings. Embodiments of the present disclosure are generally directed to a multi-location foldable bassinet. The bassinet is foldable between a stowed position and a deployed position. The bassinet includes a casing which is wall-mountable. The bassinet includes flanges and panels which are coupled to the casing. The panels are flush with the flanges in the stowed position. The panels define the sides and base of the bassinet in the deployed position.

U.S. Pat. No. 11,492,122, titled "Adapter plate for an aircraft seat"; U.S. Pat. No. 7,188,899, titled "Safe hug child restraint device"; U.S. Patent Publication Number 2011/0119832, titled "Part-detachable, foldable, and portable safety infant bed"; U.S. Pat. No. 5,845,876, titled "Bulkhead infant-toddler passive restraint system"; U.S. Patent Publication Number 2015/0345778, titled "Bassinet illumination system"; are incorporated herein by reference in the entirety.

Referring now to FIGS. 1A-1O, a bassinet 100 is described, in accordance with one or more embodiments of the present disclosure. The bassinet 100 may also be referred to as an infant bassinet, a foldable bassinet, a wall-mountable bassinet, a foldable wall-mountable bassinet, and the like. The bassinet 100 includes one or more components, such as, but not limited to, casing 102, flange 104, flange 106, longitudinal panel 108, side panel 110, side panel 112, base panel 114, one or more pins, one or more locking mechanisms, restraint system 118, one or more hinges, and the like.

The bassinet 100 includes casing 102. The casing 102 may also be referred to as a bassinet casing, frame, and the like. The casing 102 may include one or more portions, such as, but not limited to, a frame portion 120, bezel portion 122, attachment portions 124, and the like.

The casing 102 includes the frame portion 120. The frame portion 120 provides a frame for coupling the various components of the bassinet 100, as will be described further herein.

In some embodiments, the casing 102 includes the bezel portion 122. The bezel portion 122 surrounds the frame portion 120. A surface of the frame portion 120 is offset from a surface of the frame portion 122. For example, the frame portion 120 may be considered inset or recessed from the bezel portion 122. Although the casing 102 is described as including the bezel portion 122, this is not intended as a limitation of the present disclosure. It is further contemplated that the casing 102 may include the frame portion 120 with no bezel portion 122.

The casing 102 includes the attachment portions 124. The casing 102 may include any number of attachment portions 124. For example, the casing 102 is depicted as including six of the attachment portions 124, although this is not intended to be limiting. In some embodiments, the attachment portions 124 extend from the bezel portion 122. In some embodiments, the attachment portions 124 are through holes defined through the frame portion 120 and/or the bezel portion 122 (not depicted). The bassinet 100 is wall-mountable by the attachment portions 124. The attachment portions 124 enable the bassinet 100 to be attached to any vertical wall. The attachment portions 124 are used to attach the casing 102 and the bassinet 100 to a bulkhead. For example, one or more fasteners may be inserted through the attachment portions 124 to couple the bassinet 100 to the wall.

In some embodiments, the casing 102 defines one or more guide slots 126. The guide slots 126 may also be referred to as a first set of one or more guide slots. In some embodiments, the casing 102 defines one or more guide slots 128. The guide slots 128 may also be referred to as a second set of one or more guide slots. Guide slots may generally be referred to as angled slots, slanted slots, or the like.

The guide slots 126 and guide slots 128 may be rectilinear. The guide slots 126 and guide slots 128 are set at an angle relative to vertical. The guide slots 126 and guide slots 128 may be angled at any suitable angle. For example, the guide slots 126 and guide slots 128 are set at a 45-degree angle. The casing 102 may define any number of the guide slots 126 and guide slots 128. For example, the first set of the guide slots 126 may include at least two of the guide slots 126 and the second set of guide slots 128 may include at least two of the guide slots 128.

In some embodiments, the casing 102 defines one or more locking slots 128. The locking slots 128 may also be referred to as a first set of one or more locking slots. In some embodiments, the casing 102 defines one or more locking slots 132. The locking slots 132 may also be referred to as a second set of one or more locking slots.

The locking slots 128 and the locking slots 132 extend from the guide slots 126 and the guide slots 130, respectively. The locking slots 128 and the locking slots 132 are misaligned to the guide slots 126 and the guide slots 130, respectively. For example, the locking slots 128 and the locking slots 132 extend from the guide slots 126 and the guide slots 130, respectively, at an acute angle. In some embodiments, the locking slots 128 and the locking slots 132 are at a horizontal angle (e.g., orthogonal to vertical). In some embodiments, the locking slots 128 and the locking slots 132 are at vertical angle. In this regard, the locking slots 128 and the locking slots 132 may be one of horizontal locking slots or vertical locking slots. The casing 102 may define any number of the locking slots 128 and the locking slots 132. For example, the first set of the locking slots 128 may include at least two of the locking slots and the second set of the locking slots 132 may include at least two of the locking slots. The casing 102 may define locking slots 128 and locking slots 132 which correspond to the number of the guide slots 126 and the guide slots 130, respectively.

In some embodiments, the guide slots 130 and locking slots 132 are mirrored to the guide slots 126 and locking slots 128, respectively. For example, the guide slots 130 and locking slots 132 are symmetrical to the guide slots 126 and locking slots 128 along a central axis of the casing 102. In some embodiments, the guide slots 130 are orthogonal to the guide slots 126 (e.g., where the guide slots 126 are set at a 45-degree angle to vertical and the guide slots 130 are set at a 45-degree angle to vertical and where the guide slots 130 are mirrored to the guide slots 126).

The bassinet 100 includes flange 104 and flange 106. The flange 104 may also be referred to as a first flange. The flange 106 may also be referred to as a second flange. As used herein, a flange may also be referred to as a flap or the like.

In some embodiments, the flange 104 and the flange 106 abuts the casing 102. For example, the flange 104 and the flange 106 abuts the frame portion 120 of the casing 102. In some embodiments, the flange 104 and the flange 106 is disposed in a coincident plane with the bezel portion 122.

In some embodiments, the flange 104 defines one or more flange slots 136. The flange slots 136 may also be referred to as a first set of one or more flange slots. In some embodiments, the flange 106 defines one or more flange slots 137. The flange slots 137 may also be referred to as a second set of one or more flange slots. The flange slots 136 and flange slots 137 may be collectively referred to as flange slots.

The flange 104 and the flange 106 may define any number of the flange slots 136 and the flange slots 137, respectively. For example, the flange 104 may define at least two of the flange slots 136 and the flange 106 may define at least two of the flange slots 137.

In some embodiments, the flange slots 136 and the flange slots 137 may be rectilinear. In some embodiments, the flange slots 136 and the flange slots 137 are at a horizontal angle (e.g., orthogonal to vertical). In some embodiments, the flange slots 136 and the flange slots 137 are at vertical angle. In this regard, the flange slots 136 and the flange slots 137 may be one of horizontal flange slots or vertical flange slots.

The bassinet 100 includes longitudinal panel 108. The longitudinal panel 108 may also be referred to as a longitudinal body or the like. The longitudinal panel 108 is considered longitudinal in that a length of the longitudinal panel 108 is more than a length of the side panel 110 and the side panel 112. In this regard, the longitudinal panel 108 may include a length to accommodate a height of the infant.

The longitudinal panel 108 is hinged to the side panel 110, the side panel 112, and the base panel 114. For example, the longitudinal panel 108 is coupled to the side panel 110 by a hinge 138, coupled to the side panel 112 by a hinge 140, and coupled to the base panel 112 by a hinge 142. The longitudinal panel 108 is hinged to the side panel 110 and the side panel 112 at opposing ends of the longitudinal panel 108. The hinge 142 is disposed along an edge of the longitudinal panel 108 between the opposing ends and between the hinge 138 and the hinge 140. The longitudinal panel 108 is hinged to the base panel 114 between the opposing ends of the longitudinal panel.

The bassinet 100 includes side panel 110 and side panel 112. The side panel 110 may also be referred to as a first side panel. The side panel 112 may also be referred to as a second side panel. The side panel 110 and side panel 112 may each include a same length. The side panel 110 and the side panel 112 may be considered sides in that a length of the side panel 110 and the side panel 112 are less than a length of the longitudinal panel 108. The side panel 110 and the side panel 112 form sides of the bassinet 100 when the bassinet 100 is in the deployed position. For example, the side panel 110 and the side panel 112 form a head side and a foot side of the bassinet 100.

The side panel 110 is hinged to the flange 104 and the longitudinal panel 108. For example, the side panel 110 is coupled to the flange 104 by a hinge 144 and coupled to the longitudinal panel 108 by hinge 138. The side panel 110 is hinged to the flange 104 and the longitudinal panel 108 at opposing ends of the side panel 110.

The side panel 112 is hinged to the flange 106 and the longitudinal panel 108. For example, the side panel 112 is coupled to the flange 106 by a hinge 146 and coupled to the longitudinal panel by hinge 140. The side panel 112 is hinged to the flange 106 and the longitudinal panel 108 at opposing ends of the side panel 112.

The bassinet 100 includes base panel 114. The base panel 114 is considered a base in that the base panel 114 form a base for the bassinet 100 when the bassinet 100 is in the deployed position. The infant may lie on the base panel 114. In some embodiments, the base panel 114 may include padding. The infant may rest on the padding when the bassinet 100 is in the deployed position.

The casing 102, the longitudinal panel 108, the side panel 110, and the side panel 112 extend upwards from the base panel 114 when the bassinet 100 is in the deployed position. In this regard, the base panel 114 supports the infant while the casing 102, the longitudinal panel 108, the side panel 110, and the side panel 112 prevent the infant from rolling out of the bassinet 100.

The base panel 114 is hinged to the longitudinal panel 108 and the casing 102. For example, the base panel 114 is coupled to the longitudinal panel 108 by hinge 142 and to casing 102 by hinge 148. The base panel 114 is hinged to the longitudinal panel 108 and the casing 102 at opposing ends of the base panel 114.

The bassinet 100 includes one or more of the hinges. For example, the bassinet 100 includes hinge 138, hinge 140, hinge 142, hinge 144, hinge 146, hinge 148. The hinge 138, hinge 140, hinge 142, hinge 144, hinge 146, and hinge 148 may be collectively referred to as the hinges. The hinges may also be referred to as revolute joints, hinge joints, and the like. The hinges allow rotation motion of the casing, flanges, and panels relative to each other. The hinges may include any suitable hinges. For example, the hinges may include, but are not limited to, foldable hinges, piano hinges, butt hinges, concealed hinges, and the like. The hinges may be set at one or more angles. For example, the hinge 138, the hinge 140, the hinge 144, and/or the hinge 146 are at vertical angle. By way of another example, the hinge 142 and/or the hinge 148 are at a horizontal angle.

The bassinet 100 is foldable. The bassinet 100 is foldable between a stowed position and a deployed position. The stowed position may also be referred to as a closed condition, a closed position, a stowed condition, and the like. The deployed position may also be referred to as an open condition, an open position, a deployed condition, or the like. The bassinet is foldable so that the bassinet 100 can be stored in the stowed position and used to receive infants in the deployed position. The stowed position of the bassinet 100 is desirable to reduce the volume occupied by the bassinet 100. For example, the bassinet 100 occupies significantly less space in the stowed position than in the deployed position. Unfolding the bassinet 100 is desirable to ensure the bassinet 100 provides sufficient space to receive an infant.

In some embodiments, the flange 104, flange 106, longitudinal panel 108, side panel 110, side panel 112, and/or base panel 114 are in a coincident plane when the bassinet 100 is the closed position. The bezel portion 122 of the casing 102 may also be in the coincident plane. In this regard, the flange 104, flange 106, longitudinal panel 108, side panel 110, side panel 112, base panel 114 are flush mount to the bezel portion 122 when the bassinet 100 is in the stowed position.

In some embodiments, the flange 104, flange 106, longitudinal panel 108, side panel 110, side panel 112, and/or base panel 114 abut the casing 102 when the bassinet 100 is in the stowed position. For example, the flange 104, flange 106, longitudinal panel 108, side panel 110, side panel 112, and/or base panel 114 abuts the frame portion 120 when the bassinet 100 is in the stowed position.

The bassinet 100 defines a box when the bassinet 100 is in the deployed position. For example, the longitudinal panel 108, side panel 110, side panel 112, and base panel 114 define the box when the bassinet 100 is in the deployed position. The box is open-topped. An infant may be placed in the box via the open top. The dimensions of the longitudinal panel 108, side panel 110, side panel 112, and base panel 114 are selected to define the open-topped box with a given width and height. It is contemplated that the bassinet 100 may accommodate infants up to two years old, depending upon the dimensions of the infant.

In some embodiments, the flange 104 and/or the flange 106 are in a coincident plane when the bassinet 100 is the deployed position. The bezel portion 122 of the casing 102 may also be in the coincident plane. In this regard, the flange 104 and/or flange 106 are flush mount to the bezel portion 122 in the deployed position.

In some embodiments, the flange 104 and/or flange 106 abut the casing 102 when the bassinet 100 is in the deployed position. For example, the flange 104 and/or flange 106 abuts the frame portion 120 when the bassinet 100 is in the deployed position.

In some embodiments, the side panel 110 and the side panel 112 are orthogonal to the flange 104 and the flange 106, respectively, when the bassinet 100 is the deployed position. In some embodiments, the side panel 110 and the side panel 112 are in a coincident plane with the flange 104 and the flange 106, respectively, when the bassinet 100 is the stowed position. The side panel 110 and the side panel 112 rotate from being in a coincident plane with the flange 104 and the flange 106, respectively, in the stowed position to orthogonal to the flange 104 and the flange 106, respectively, in the deployed position.

In some embodiments, the base panel 114 is orthogonal with the casing 102 when the bassinet 100 is the deployed position. For example, the base panel 114 may be orthogonal with the frame portion 120 when the bassinet 100 is in the deployed position. The base panel 114 rotates from abutting the casing 102 in the stowed position to being orthogonal with the casing 102 in the deployed position.

In some embodiments, the base panel 114 is orthogonal to the side panel 110 and/or the side panel 112 when the bassinet 100 is in the deployed position. In some embodiments, the base panel 114 is in a coincident plane with the side panel 110 and/or the side panel 112 when the bassinet 100 is in the stowed position. The base panel 114 rotates from being in the coincident plane with the side panel 110 and the side panel 112 in the stowed position to orthogonal to the side panel 110 and the side panel 112 in the deployed position.

In some embodiments, the longitudinal panel 108 is parallel with the casing 102 when the bassinet 100 is the deployed position. For example, the longitudinal panel 108 may be parallel with the frame portion 120 when the bassinet 100 is in the deployed position.

In some embodiments, the longitudinal panel 108 is orthogonal to the side panel 110, the side panel 112, and/or the base panel 114 when the bassinet 100 is the deployed position. In some embodiments, the longitudinal panel 108 is in a coincident plane with the side panel 110, the side panel 112, and/or the base panel 114 when the bassinet 100 is in the stowed position. The longitudinal panel 108 rotates from being in the coincident plane with the side panel 110, the side panel 112, and/or the base panel 114 in the stowed position to orthogonal to the side panel 110, the side panel 112, and/or the base panel 114 in the deployed position.

A portion of the flange slots 136 are aligned with a portion of the guide slots 126 throughout the motion of the bassinet 100 between the stowed position and the deployed position. Similarly, a portion of the flange slots 137 are aligned with a portion of the guide slots 130 throughout the motion of the bassinet 100 between the stowed position and the deployed position.

The flange slots 136 are aligned with the locking slots 128 when the bassinet 100 is in the deployed position. Similarly, the flange slots 137 are aligned with the locking slots 132 when the bassinet 100 is in the deployed position.

In some embodiments, the flange 104 and/or the flange 106 translate relative to the casing 102 between the stowed position and the deployed position. For example, the flange 104 and/or the flange 106 translate relative to the casing 102 between the stowed position and the deployed position by following the guide slots 126 and the guide slots 130, respectively. The flange 104 follows the guide slots 126 as the bassinet 100 folds between the stowed position and the deployed position. For example, the flange 104 may translate relative to the casing 102 along a path defined by the guide slots 126. Similarly, the flange 106 follows the guide slots 130 as the bassinet 100 folds between the stowed position and the deployed position. For example, the flange 106 may translate relative to the casing 102 along a path defined by the guide slots 130. Thus, the flange 104 follows the guide slots 126 and the flange 106 follows the guide slots 130 as the bassinet 100 folds between the stowed position and the deployed position.

In some embodiments, the bassinet 100 includes one or more pins 150. The pins 150 may also be referred to as a first set of one or more pins 150. In some embodiments, the bassinet 100 includes one or more pins 151. The pins 151 may also be referred to as a second set of one or more pins 150.

The pins 150 and the pins 151 couple the casing 102 to the flange 104 and to the flange 106, respectively. The flange 104 follows the guide slots 126 and the flange 106 follows the guide slots 130 as the bassinet 100 folds between the stowed position and the deployed position via the pins 150 and the pins 151, respectively. The pins 150 and the pins 151 are inserted through the flange slots 136 and the flange slots 137, respectively. The guide slots 126 and the locking slots 128 may receive pins 150. The guide slots 130 and the locking slots 132 may receive pins 151.

The pins 150 and the pins 151 couple the casing 102 to the flange 104 and to the flange 106 by a cam follower joint. For example, the guide slots 126 and the locking slots 128 may act as inner cams for the pins 150. By way of another example, the guide slots 130 and the locking slots 132 may act as inner cams for the pins 151. The pins 150 follow the guide slots 126 and/or the locking slots 128. Similarly, the pins 151 follow the guide slots 130 and/or the locking slots 132. The pins 150 and the pins 151 may follow the guide slots 126 and guide slots 130, respectively, as the bassinet 100 moves between the stowed position and the deployed position. The pins 150 may follow both the locking slots 128 and the flange slots 136 when the bassinet 100 is in the deployed position. Similarly, the pins 151 may follow both the locking slots 132 and the flange slots 137 when the bassinet 100 is in the deployed position.

The pins 150 and the pins 151 may follow both the locking slots (i.e., locking slots 128 and locking slots 132, respectively) and the flange slots (i.e., flange slots 136 and flange slots 137, respectively) between an unlocked position to a locked position. For example, the pins 150 and the pins 151 may slide horizontal and/or vertical between the unlocked position and the locked position. The pins 150 and pins 151 are prevented from following the guide slots 126 and guide slots 130, respectively, when the pins 150 and the pins 150 are positioned in the locked position. Preventing the pins 150 and pins 151 from following the guide slots is desirable to lock the bassinet 100 in the stowed position. For example, the bassinet 100 is prevented from inadvertently stowing when the pins 150 and the pins 151 are in the lock position.

In some embodiments, the bassinet 100 includes one or more locking mechanisms 116. The locking mechanisms 116 may be referred to as a first set of one or more locking mechanisms. In some embodiments, the bassinet 100 includes one or more locking mechanisms 117. The locking mechanisms 117 may be referred to as a second set of one or more locking mechanisms. The locking mechanisms 116 and the locking mechanisms 117 may be collectively referred to as the locking mechanisms.

The locking mechanisms 116 and the locking mechanism 117 are configured to lock and unlock the casing 102 relative to the flange 104 and the flange 106, respectively. For example, the locking mechanisms 116 lock to prevent the flange 104 from translating relative to the casing 102 and the locking mechanisms 117 lock prevent the flange 106 from translating relative to the casing 102. Unlocking may also be referred to as releasing. Locking the flanges relative to the casing 102 may prevent the bassinet 100 from moving between the stowed position and the deployed position. The bassinet 100 may be moved between the stowed position and the deployed position when the locking mechanisms 116 and the locking mechanisms 117 are unlocked. The locking mechanisms 116 and the locking mechanisms 117 are coupled to the pins 150 and the pins 151, respectively.

In some embodiments, the locking mechanisms are a cam lever. The cam lever may also be referred to as a cam handle. The cam lever is rotatable between a locked position and an unlocked position. The cam lever includes a lever portion 152 and a cam profile 154.

The cam lever includes the lever portion 152. The lever portion 152 extends from the cam profile 154. The lever portion 152 provides a handle for rotating the cam profile 154. The lever portion 152 unlocks the cam lever by lifting the lever portion 152 away from the flange 104 and locks the cam lever by pressing the lever portion 152 towards the flange 104.

The cam lever includes the cam profile 154. The cam profile 154 is rotatably coupled to the pins 150. The locking mechanisms follow the pins 150 and pins 151 by the rotatably coupling between the cam profile 154 and the pins 150. The cam profile 154 clamps the casing 102 to the flange when the cam lever is in the locked position. Clamping the flange 104 against the casing 102 locks the bassinet 100. For example, the bassinet 100 is held by friction between the casing 102 and the flanges, where the friction is induced by the cam profile 154 pressing the flanges against the casing 102. The cam profile 154 unclamps the flanges from the casing 102 when the cam lever is in the unlocked position.

Although the locking mechanisms are described as the cam lever, this is not intended as a limitation of the present disclosure. It is contemplated that the locking mechanisms may include many possible configurations for locking the flanges relative to the casing 102. For example, the locking mechanisms may include, but is not limited to, a cam lever, a draw latch, and the like. However, the locking mechanisms 116 being the cam lever may be beneficial to provide a quick release. Additionally, the cam lever may provide a reduced profile for the casing 102. For example, the use of a draw latch or the like to lock the bassinet 100 in the deployed position may require insetting the draw latch in the frame portion 120. The insetting may be required to prevent interference with the motion of the bassinet 100. However, the insetting may undesirably increase a thickness of the frame portion 120.

In some embodiments, the locking mechanisms (i.e., locking mechanisms 116, locking mechanisms 117) in combination with locking the pins in the locking slots (i.e., pins 150 in locking slots 128 and pins 151 in locking slots 132) may provide a dual means of securing the bassinet 100 in the deployed position. The dual means of securing the bassinet 100 in the deployed position provides protection to the infant disposed in the bassinet 100. For example, the bassinet 100 may be within an aircraft cabin when the aircraft is in cruise mode. The aircraft may experience turbulence and the like. The dual means ensures the bassinet 100 does not accidentally stow with the infant when the bassinet 100 is subject to turbulence.

Although the casing 102, flange 104, and flange 106 are described as including locking slots and flange slots, this is not intended as a limitation of the present disclosure. For example, the locking slots and flange slots may not be used where the locking mechanisms 116 is sufficiently strong to lock the bassinet 100 in the deployed position, such that the dual means of securing the bassinet 100 in the deployed position is not needed.

In some embodiments, the bassinet 100 includes restraint system 118. The restraint system 118 may be coupled to at least one of the casing 102, flange 104, flange 106, longitudinal panel 108, side panel 110, side panel 112, and/or base panel 114. The restraint system 118 may be disposed between the casing 102 and the base panel 114 when the bassinet is in the stowed position. The restraint system 118 secures the infant to the bassinet 100 when the bassinet 100 is in the deployed position. The restraint system 118 safeguards the infant during turbulence. The restraint system 118 may include a harness 158, a fastener 160, and the like. The harness 158 may include a two-point harness, three-point harness, and the like. The harness 158 may be coupled to any of the casing 102, flange 104, flange 106, longitudinal panel 108, side panel 110, side panel 112, and/or base panel 114. The fastener 160 may be used to secure the harness 158. The fastener 160 may include any suitable fastener, such as, but not limited to, hook-and-loop fasteners (e.g., Velcro™), a zipper, a buckle, and the like.

In some embodiments, the bassinet 100 includes beading 156. The beading 156 is coupled across top edges of the longitudinal panel 108, side panel 110, and/or side panel 112. The beading 156 reduces sharp edges associated with the top edges of the longitudinal panel 108, side panel 110, and/or side panel 112. The beading 156 may also reduce pinching as the bassinet 100 moves to the stowed position. The beading 156 may include any suitable material. For example, the beading 156 may include rubber beading or the like.

The bassinet 100 and components thereof may be made of any suitable material. For example, the casing 102, flanges, and/or panels may be made a material, such as, but not limited to, aluminum, plastic, or the like. In some embodiments, the hinges are foldable plastic hinges where the casing 102, flanges, and/or panels are made of plastic. In some embodiments, the hinges are piano hinges where the casing 102, flanges, and/or panels are made of aluminum.

In some embodiments, the casing 102 defines a crescent shape 134. The crescent shape 134 is defined in the bezel portion 122. The crescent shape 134 is a handhold for accessing the longitudinal panel 108. For example, the longitudinal panel 108 may be pulled down via the crescent shape 134 when the bassinet 100 is in the stowed position.

In some embodiments, the longitudinal panel 108, side panel 110, side panel 112, and base panel 114 are rectangular-shaped.

Figure 2A:
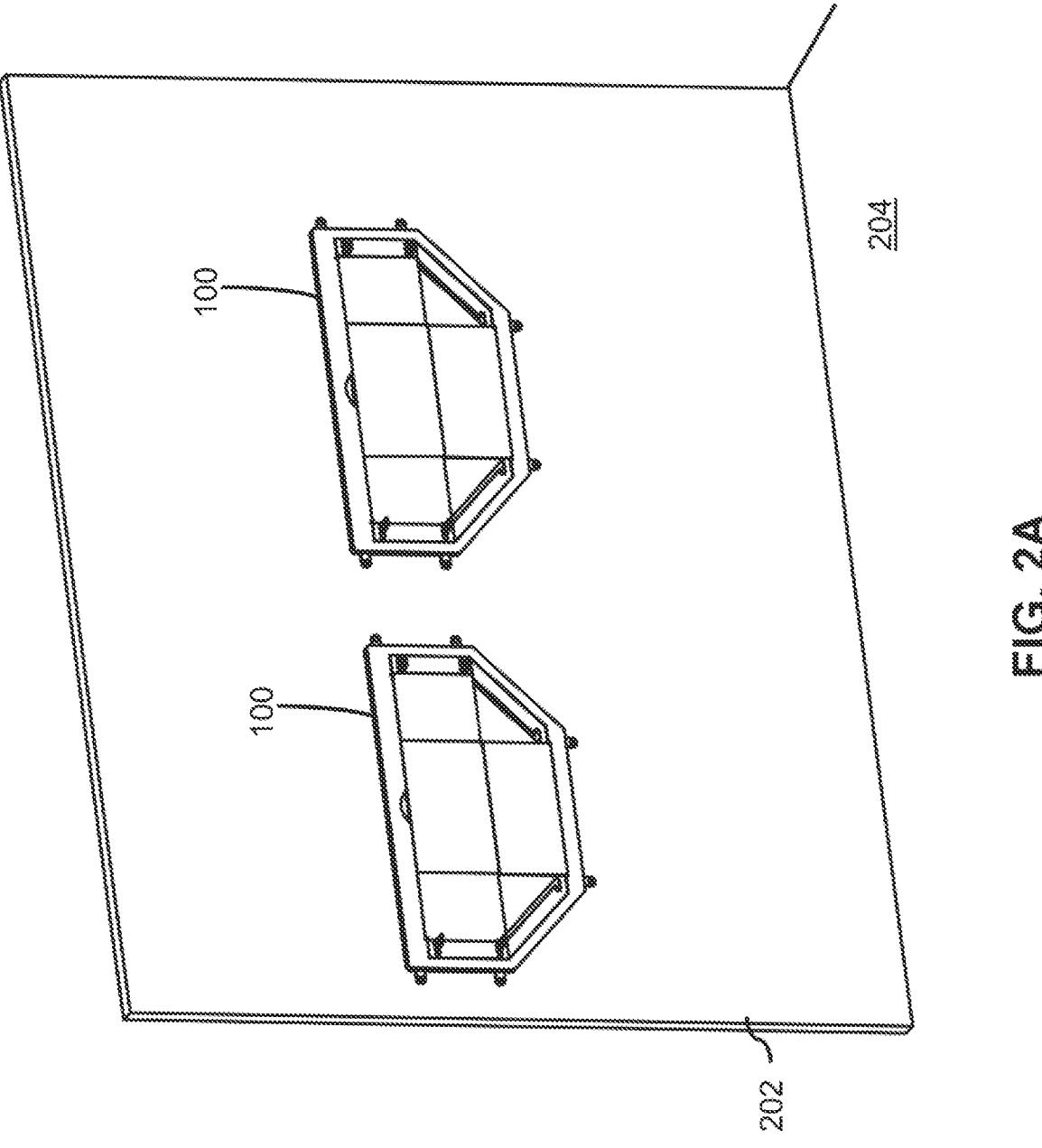
FIG. 2A depicts a perspective view of an aircraft cabin with a pair of bassinets in a stowed position, in accordance with one or more embodiments of the present disclosure.
Figure 2B:
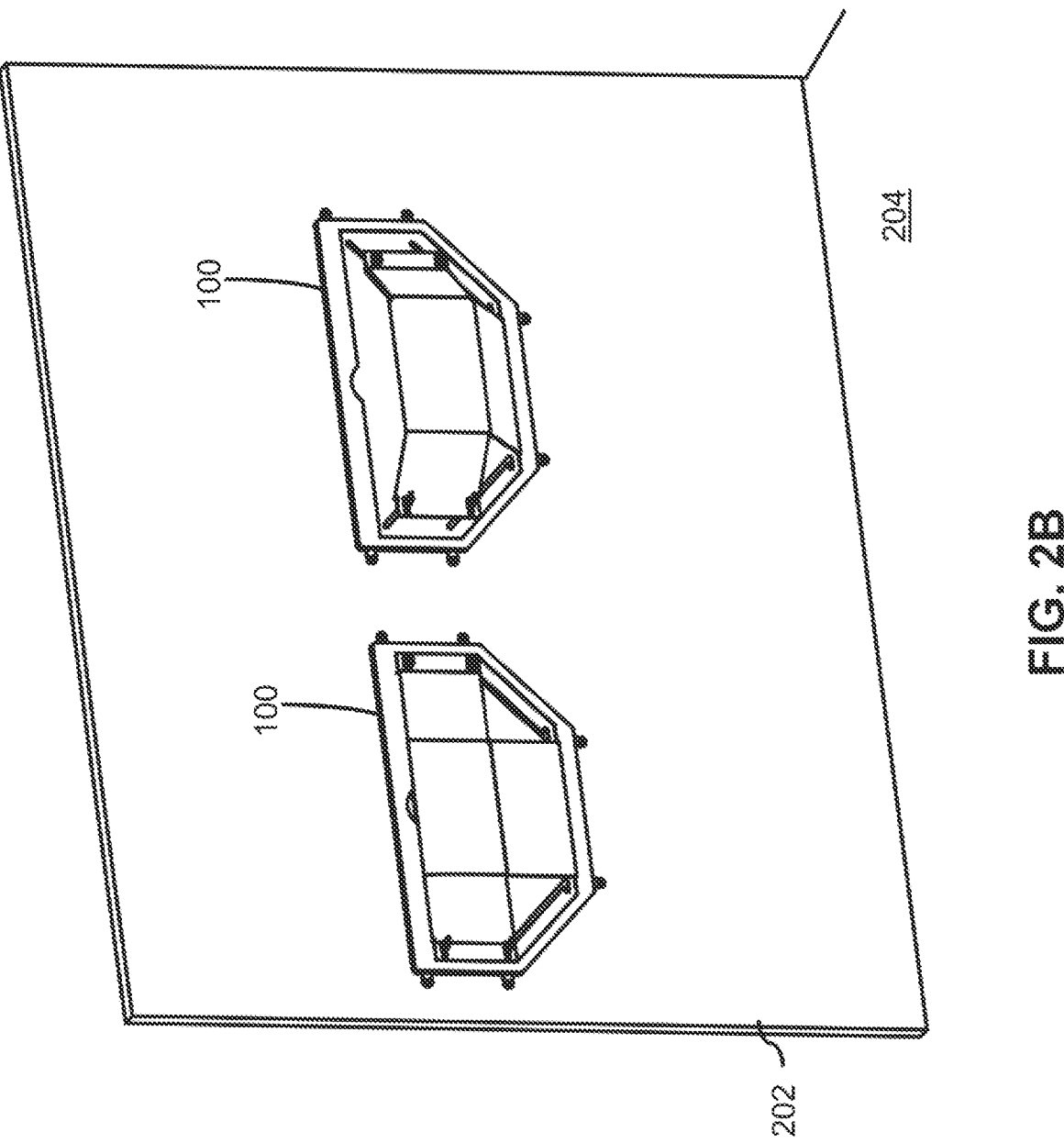
FIG. 2B depicts a perspective view of an aircraft cabin with a first bassinet in a stowed position and a second bassinet midway between a stowed position and a deployed position, in accordance with one or more embodiments of the present disclosure.
Figure 2C:
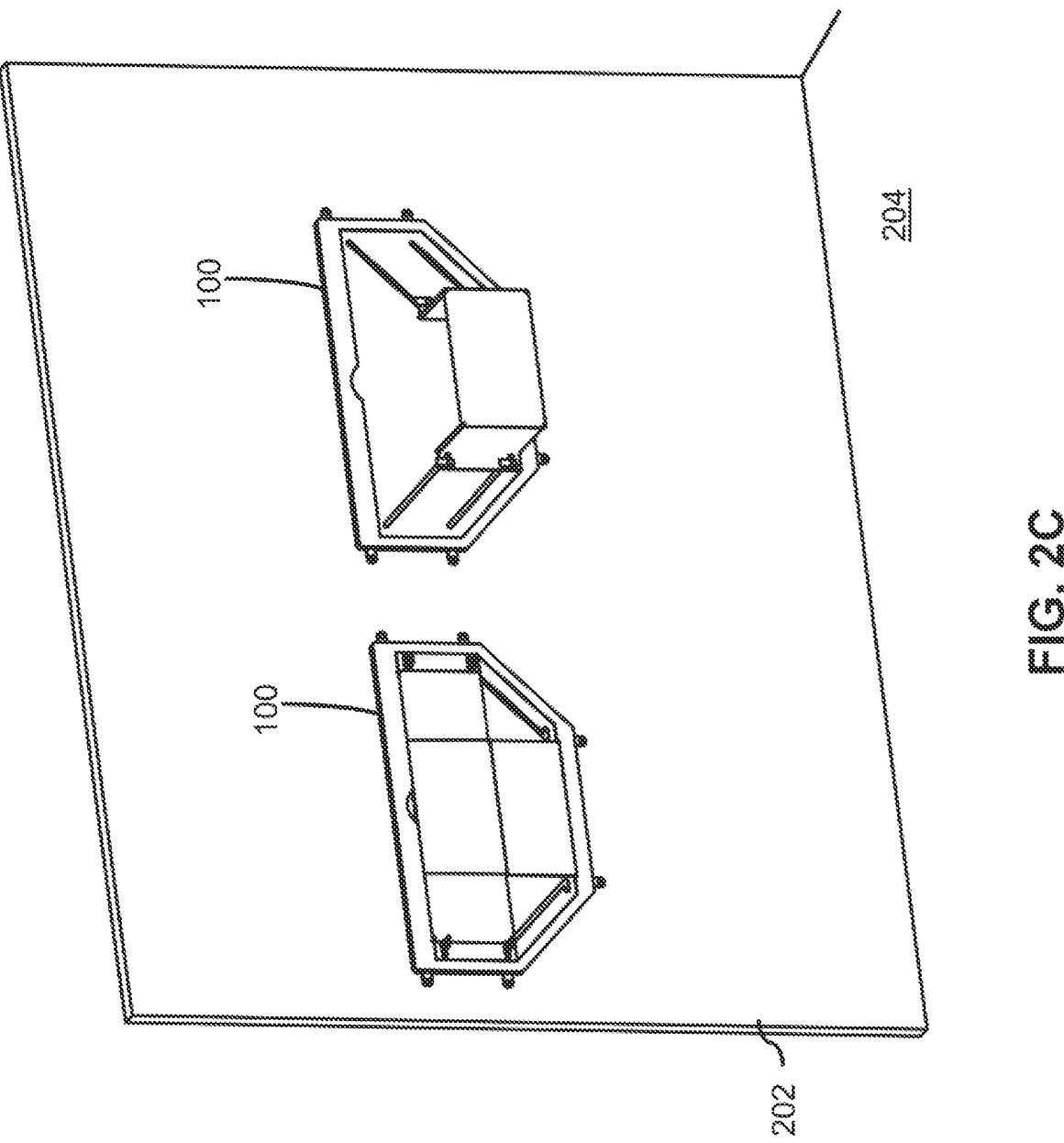
FIG. 2C depicts a perspective view of an aircraft cabin with a first bassinet in a stowed position and a second bassinet in a deployed position, in accordance with one or more embodiments of the present disclosure.

Referring now to FIGS. 2A-2C, an aircraft cabin 200 is described, in accordance with one or more embodiments of the present disclosure. The aircraft cabin 200 includes one or more components, such as one or more of the bassinets 100, a bulkhead 202, a floor 204, and the like.

The aircraft cabin 200 includes the bulkhead 202. The bulkhead 202 may also be referred to as a monument, divider, partition, wall, and the like. The bulkhead 202 may divide one or more regions of the aircraft cabin 200. For example, the bulkhead 202 may divide a passenger seating area from a galley, or the like.

The aircraft cabin 200 also includes the floor 204. The bulkhead 202 is orthogonal to the floor 204.

The bassinets 100 are coupled to the bulkhead 202. For example, the bassinets 100 are coupled to the bulkhead 202 by the attachment portions 124. The casing 102 of the bassinets 100 abut the bulkhead 202 when the bassinets 100 are coupled to the bulkhead. The bassinet 100 provides the option of being attached at multiple locations in the aircraft cabin 200. For example, the bassinet 100 may be attached at any location with sufficient room for the attachment portions 124 and which includes bulkhead 202 to abut the casing 102. The bassinets 100 may be added or removed from the aircraft cabin 200 as desired.

The bassinets 100 enable carrying infants in the aircraft cabin 200 without requiring a car seat attached to an aircraft seat. The bassinets 100 help the airliner in using the bassinet stowage space for some other purpose.

In some embodiments, the aircraft cabin 200 may include multiple of the bassinets 100. Including multiple of the bassinets may be desirable to increase the number of available bassinets 100 at any given time. The bassinets 100 are independently configurable between the stowed position and the deployed position.

Referring generally again to FIGS. 1A-2C.

In some embodiments, the bassinet 100 may include a cover (not depicted). The cover may be used to cover the box defined by the panels. The cover may include a fabric cover or the like. The cover may block noise and the like. Blocking the noise may help the infant to sleep within the bassinet 100.

It is further contemplated that each of the embodiments of the methods described above may include any other step(s) of any other method(s) described herein. In addition, each of the embodiments of the method described above may be performed by any of the systems described herein.

One skilled in the art will recognize that the herein described components operations, devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components, operations, devices, and objects should not be taken as limiting.

As used herein, directional terms such as "top," "bottom," "over," "under," "upper," "upward," "lower," "down," and "downward" are intended to provide relative positions for purposes of description, and are not intended to designate an absolute frame of reference. Various modifications to the described embodiments will be apparent to those with skill in the art, and the general principles defined herein may be applied to other embodiments With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mixable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A bassinet comprising:
a casing; wherein the casing defines a first set of one or more guide slots and a second set of one or more guide slots;
a first flange;
a second flange;
a longitudinal panel;
a first side panel; wherein the first side panel is hinged to the first flange and the longitudinal panel;
a second side panel; wherein the second side panel is hinged to the second flange and the longitudinal panel;
a base panel; wherein the base panel is hinged to the longitudinal panel and the casing; and
a first set of one or more pins and a second set of one or more pins; wherein the first set of one or more pins couple the first flange to the first set of one or more guide slots; wherein the second set of one or more pins couple the second flange to the second set of one or more guide slots;
wherein the bassinet is configured to fold between a stowed position and a deployed position; wherein the first flange follows the first set of one or more guide slots and the second flange follows the second set of one or more guide slots as the bassinet folds between the stowed position and the deployed position;
wherein the casing defines a first set of one or more locking slots; wherein the first set of one or more locking slots extend from the first set of one or more guide slots; wherein the first flange defines a first set of one or more flange slots; wherein the first set of one or more flange slots are aligned with the first set of one or more locking slots when the bassinet is in the deployed position; wherein the first set of one or more pins are configured to follow the first set of one or more flange slots and the first set of one or more locking slots when the bassinet is in the deployed position.

2. The bassinet of claim 1, wherein the casing comprises a frame portion and a bezel portion; wherein the frame portion defines the first set of one or more guide slots and the second set of one or more guide slots; wherein the bezel portion surrounds the frame portion.

3. The bassinet of claim 2, wherein the first flange, the second flange, the longitudinal panel, the first side panel, the second side panel, and the base panel are flush mount to the bezel portion when the bassinet is in the stowed position.

4. The bassinet of claim 2, wherein the casing comprises one or more attachment portions; wherein the one or more attachment portions extend from the bezel portion.

5. The bassinet of claim 1, wherein the first set of one or more pins are configured to follow the first set of one or more flange slots and the first set of one or more locking slots between an unlocked position and a locked position; wherein the first set of one or more pins are prevented from following the first set of one or more guide slots when in the locked position.

6. The bassinet of claim 1, wherein the first set of one or more locking slots are set at one of a horizontal angle or a vertical angle.

7. The bassinet of claim 1, comprising a first set of one or more locking mechanisms; wherein the first set of one or more locking mechanisms are configured to lock to prevent the first flange from translating relative to the casing; wherein the first set of one or more locking mechanisms are coupled to the first set of one or more pins.

8. The bassinet of claim 7, wherein the first set of one or more locking mechanisms comprises a cam lever.

9. The bassinet of claim 1, wherein the second set of one or more guide slots are mirrored to the first set of one or more guide slots.

10. The bassinet of claim 9, wherein the first set of one or more guide slots and the second set of one or more guide slots are set at a 45-degree angle; wherein the first set of one or more guide slots are orthogonal to the second set of one or more guide slots.

11. The bassinet of claim 1, wherein the first side panel is hinged to the first flange and the longitudinal panel at opposing ends of the first side panel; wherein the second side panel is hinged to the second flange and the longitudinal panel at opposing ends of the second side panel; wherein the longitudinal panel is hinged to the first side panel and to the second side panel at opposing ends of the longitudinal panel; wherein the longitudinal panel is hinged to the base panel between the opposing ends of the longitudinal panel; wherein the base panel is hinged to the longitudinal panel and the casing at opposing ends of the base panel.

12. The bassinet of claim 1, comprising a restraint system; wherein the restraint system is coupled to at least one of the casing, the first flange, the second flange, the longitudinal panel, the first side panel, the second side panel, or the base panel; wherein the restraint system comprises a harness.

13. The bassinet of claim 1, comprising beading; wherein the beading is coupled across top edges of the longitudinal panel, the first side panel, and the second side panel.

14. The bassinet of claim 1, wherein the first set of one or more guide slots and the second set of one or more guide slots are rectilinear.

15. The bassinet of claim 1, wherein the first side panel is orthogonal to the first flange and the second side panel is orthogonal to the second flange when the bassinet is in the deployed position.

16. The bassinet of claim 15, wherein the base panel is orthogonal to the first side panel and the second side panel when the bassinet is in the deployed position.

17. The bassinet of claim 16, wherein the longitudinal panel is orthogonal to the first side panel, the second side panel, and the base panel when the bassinet is in the deployed position.

18. An aircraft cabin comprising:

a bulkhead; and a bassinet, comprising:

a casing; wherein the casing is coupled to the bulkhead; wherein the casing defines a first set of one or more guide slots and a second set of one or more guide slots;

a first flange;

a second flange;

a longitudinal panel;

a first side panel; wherein the first side panel is hinged to the first flange and the longitudinal panel;

a second side panel; wherein the second side panel is hinged to the second flange and the longitudinal panel; and a base panel; wherein the base panel is hinged to the longitudinal panel and the casing; and a first set of one or more pins and a second set of one or more pins;

wherein the first set of one or more pins couple the first flange to the first set of one or more guide slots;

wherein the second set of one or more pins couple the second flange to the second set of one or more guide slots;

wherein the bassinet is configured to fold between a stowed position and a deployed position; wherein the first flange follows the first set of one or more guide slots and the second flange follows the second set of one or more guide slots as the bassinet folds between the stowed position and the deployed position;

wherein the casing defines a first set of one or more locking slots; wherein the first set of one or more locking slots extend from the first set of one or more guide slots; wherein the first flange defines a first set of one or more flange slots; wherein the first set of one or more flange slots are aligned with the first set of one or more locking slots when the bassinet is in the deployed position; wherein the first set of one or more pins are configured to follow the first set of one or more flange slots and the first set of one or more locking slots when the bassinet is in the deployed position.

* * * * *